US008210916B2

(12) United States Patent  
Ma et al.

(10) Patent No.: US 8,210,916 B2  
(45) Date of Patent: Jul. 3, 2012

(54) REAL-TIME PLAY VALUATION

(75) Inventors: Jeffrey K. Ma, San Francisco, CA (US); Michael J. Kerns, San Francisco, CA (US); Steven A. McClelland, San Francisco, CA (US); Mark S. Kamal, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1806 days.

(21) Appl. No.: 11/186,502

(22) Filed: Jul. 21, 2005

(65) Prior Publication Data

US 2007/0021167 A1 Jan. 25, 2007

(51) Int. Cl.
*A63F 13/00* (2006.01)
(52) U.S. Cl. .................................. 463/4; 463/1; 463/7
(58) Field of Classification Search ................... 463/1, 6, 463/40–42, 7
See application file for complete search history.

(56) References Cited

U.S. PATENT DOCUMENTS 7,092,847 B2 * 8/2006 Storch ........................... 702/182

OTHER PUBLICATIONS

"Method to Our Madness" posted on www.footballoutsiders.com on Dec. 7, 2004. Retreived at http://web.archive.org/web/20041207000341/http://www.footballoutsiders.com/methods.php on Sep. 11, 2008.*

Thorn, J. et al., "The Hidden Game of Baseball," Chapter 8, The Book . . . and the Computer, 1985, pp. 150-168, Doubleday & Company, Inc., Garden City, New York.
The Nats Blog: Sabermetric Scoring, Sunday, Jan. 2, 2005, 5 pages.
Tom Ruane's NERV Tables Since 1963, 14 pages.
Schwarz, A., "Managing with Markov," Harvard Magazine, May-Jun. 2002, 6 Pages.
Surowiecki, J., "Slate talks to the man who revolutionized baseball," Moneyball Redux, Posted Tuesday, Jun. 10, 2003, 6 Pages.
BBTF's Primate Studies Discussion, "Ultimate Zone Rating (UZR), Part 1," http://www.baseballthinkfactory.org/files/primate_studies/discussion/lichtman_2003-03-14_0, Mar. 14, 2003, 6 pages.
BBTF's Primate Studies Discussion, "Ultimate Zone Rating (UZR), Part 2," http://www.baseballthinkfactory.org/files/primate_studies/discussion/lichtman_2003-03-21_0, Mar. 21, 2003, 9 pages.
"Baseball Prospectus Glossary," http://baseballprospectus.com, accessed Jul. 12, 2005, 28 pages.
Romer, D., "It's Fourth Down and What Does the Bellman Equation Say? A Dynamic-Programming Analysis of Football Strategy," Feb. 2003, 42 pages.
Carroll, B. et al., "The hidden game of football," Chapters 4-6, pp. 53-96, 1988, Warner Books, Inc., New York, N.Y.

(Continued)

*Primary Examiner* — Ronald Laneau
*Assistant Examiner* — Ross Williams
(74) *Attorney, Agent, or Firm* — James J. DeCarlo; Greenberg Traurig, LLP

(57) ABSTRACT

A valuation system determines in real-time values of plays occurring during games by identifying a play that occurred during a game. The system determines an expectation of scoring prior to the play occurring, and an expectation of scoring that results from the play occurring. The system then calculates a value of the play as the difference between the expectation of scoring that results from the play occurring and the expectation of scoring that existed prior to the play occurring, and any scoring generated by the play.

35 Claims, 14 Drawing Sheets

OTHER PUBLICATIONS

Football Outsiders, "Methods to Our Madness," http://www.footballoutsiders.com/methods.php, 11 pages, accessed Jul. 12, 2005.

NBA Roland Ratings, "NBA 2004-05 Roland Ratings!" http://www.82games.com/rolandratings0405.htm, 3 pages.

Basketball-Reference.com, "Calculating PER," 2004-2005, 3 pages.

"Foul Trouble? NBA Performance by Team Foul State," NBA "Foul State" Research from 82games.com, 2003-2005, 8 pages.

Baseball Think Factory, http://web.archive.org/web/20050209233114/http://www.baseballthinkfactory.com/, 3 pages, 1996-2005.

Baseball Primer—baseball for the thinking fan, http://web.archive.org/web/20040202001153/www.baseballprimer.com/, 2001-2003, 3 pages.

Tango on Baseball, http://www.tangotiger.net/, accessed Oct. 10, 2006, 8 pages.

Alleyoop.com, "The Basketball Page for Thinking Fans," http://www.alleyoop.com/index.shtm, Jan. 26, 2006, 8 pages.

Avocare, "Economic Inefficiencies In Professional Athlete Valuation, Or Why Stanley Needs a Tan," http://www.avocare.net/archives/001520.html, 3 pages, accessed Mar. 9, 2005.

BLBEX.COM, http://www.blbex.com/index.php, 2 pages, 2002-2004.

Jockstocks.com, http://www.jockstocks.com, 1 page, 2004-2006.

Wall Street Sports, http://web.archive.org/web20040525164657/http://wallstreetsports.com/, 2 pages, 2002.

Allsportsmarket.com, "The World's First Sports Stock Market," http://www.allsportsmarket.com, 2 pages, 2001-2006.

Athletic Stock Exchange, http://web.archive.org/web/20050305081955/http://athleticstockexchange.com/, 2 pages, Feb. 26, 2005 [web page under construction].

Playerline.com, Fantasy Football Contest, Playerline Corporation, http://www.playeriine.com, 1 page, 2005.

Sportingnews.com, Fantasy Football Games, http://web.archive.org/web/20040405144603/fantasygames.sportingnews.com/football/home.html, 2 pages, 2004.

Rotoworld.com, "Baseball Super League," http://web.archive.org/web/20040715043157/http://rotoworld.com/, 3 pages, 2003-2004.

* cited by examiner

REAL-TIME PLAY VALUATION

RELATED APPLICATIONS

The present application is related to the co-pending and commonly owned U.S. patent applications having the following titles and attorney docket numbers, each of which was filed on even date herewith:
1. ATHLETE VALUATION, Ser. No. 11/186,503;
2. FANTASY SINGLE SPORT CHALLENGE, Ser. No. 11/186,602;
3. FANTASY CROSS-SPORT CHALLENGE, Ser. No. 11/186,368; and
4. GRAPHICAL USER INTERFACE FOR A FANTASY SPORTS APPLICATION, Ser. No. 11/186,469.

Each of the above referenced patent applications is incorporated by reference herein in their entireties.

TECHNICAL FIELD

The described technology is directed generally to athletic competitions and, more particularly, to techniques for measuring the value of a play throughout the course of the athletic competition.

BACKGROUND

Fantasy sports and fantasy leagues are well known and becoming increasingly popular with sports enthusiasts. Generally, a fantasy sport is a simulation game where participants, usually real sports fans, select or draft currently active real-life athletes to form fantasy teams, and a fantasy league consists of a number of these participants and their fantasy teams. The fantasy teams in the fantasy league compete head to head against each of the other teams in the fantasy league, and a participant's success or failure in the fantasy league is determined by the won-lost record compiled during a fantasy season by the participant's fantasy team. The outcome of a fantasy game is determined by which fantasy team's athletes cumulatively performed better in each of the athletes' real-life athletic competitions the previous week.

Typically, an athlete's performance is based solely on the statistics the athlete garnered during the course of the athlete's real-life athletic competition, as determined at the end of the athletic competition. For example, in a football fantasy league, points (either positive or negative) may be assigned to athletes based on statistics such as touchdowns scored, extra points kicked, yards gained rushing, yards gained passing, completion percentage, yards gained receiving, fumbles recovered, fumbles lost, interceptions thrown, etc. In fantasy baseball, points (either positive or negative) may be assigned to athletes based on the number of total bases, number of hits, number of runs batted in, number of singles, doubles, triples and home runs hit, number of runs allowed, number of hits allowed, errors committed, etc.

A major problem with assigning points based purely on an athlete's cumulated statistics is that it does not account for the different situations during the course of the competition. For example, a three yard rush is different depending on the game situation. If the three yard rush play results in a touch down to win the game, it is a success, but if the three yard rush play came on fourth down with four yards to go with the team losing by one touchdown with five minutes to play in the game, the same three yard rush is a failure. Yet, conventional fantasy football statistics count the plays based solely on their yardage, and the three yard rush contributes the same to an athlete's total yards gained rushing during the competition, and the resulting points that are based on the total yards gained rushing.

Determining an athlete's performance based on the number of points exaggerates the problem. This is because conventional fantasy football scoring counts the one yard between the one yard line and the goal line as significantly more important than all of the other yards on the field. For example, a wide receiver may have caught a pass on third-and-twenty and ran for sixty yards to the opponent's one yard line before being tackled. On the subsequent play, the running back ran the remaining one yard for a touchdown. Has the running back done something special? Not really. Yet, conventional fantasy football scoring values the touchdown more than the sixty yard reception on the third-and-twenty play that set up the running back's touchdown.

Similar problems exist in conventional fantasy baseball scoring. For example, a home run hit by a batter in the first inning with the bases empty is valued less than a double when the team is down by one run in the ninth inning with two outs and runners on first and second base.

Similar problems are present outside of the fantasy realm. Many National Football League (NFL) scouts and talent evaluators determine the best players by adding up all of the yards gained by each player without regard to the situations in which the yards were gained or how many plays it took for the player to gain the yards. There is no distinction between the fifty yards gained by a player while running out the clock in the fourth quarter against the opposing team's first string defense with the player's team protecting a one point lead, and the fifty yards gained by the player in the fourth quarter against the opposing team's third string defense with the player's team trailing by three touchdowns. Similarly, in baseball, a home run hit by a player against the opposing team's fifth best relief pitcher while the player's team is leading by ten runs counts the same as a home run hit by the player that wins the game for the player's team in determining the value of the player. Likewise, in basketball, ten points scored by a player while the game is still undecided is counted the same as ten points scored by the player during "garbage time" after the game has been all but decided.

DETAILED DESCRIPTION

Figure 1:
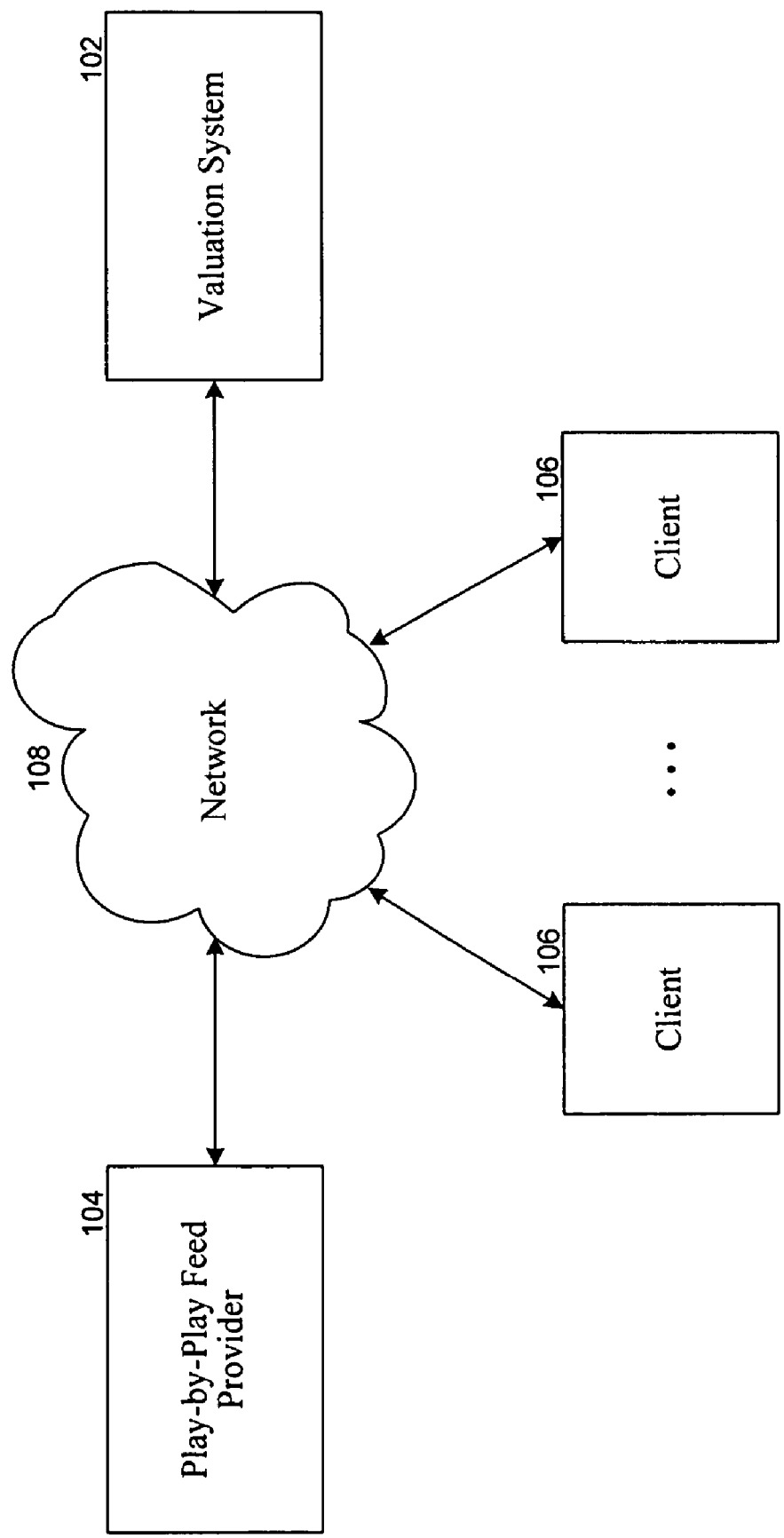
FIG. 1 is a high-level block diagram showing an environment in which a valuation system may operate.

An approach to measuring the value or significance of each play throughout the course of an athletic game or athletic competition in real-time is provided. The terms "game" and "competition" as used herein refer to the actual real-life athletic game, contest or competition, and are used interchangeably herein. Also, the term "real-time" as used herein refers to processing as the plays are occurring within the game or shortly after the completion of the game. In some embodiments, the value or significance of each play is based on the expectation of scoring (i.e., number of runs, points, or other scoring method) based on the state of the game (also referred to as "game state"). For example, at any given point in time during a game, a team has an expectation of the number of runs or points the team will score. In an individual sport, a player will have an expectation of the number of runs or points the player will score. The expectation of the number of runs or points is based on the state of the game at the given point in time during the game—i.e., prior to a play occurring during the game.

The factors that determine the game states vary from sport to sport. For example, for baseball, the factors that determine a game state may include the current score, the current inning, the number of outs in the inning, the number of base runners and position of each of the base runners, etc. For football, the factors that determine a game state may include the current time in the game, the current down and distance, the spot or position on the field, the current score, weather conditions, etc.

Net expected score (NES) refers to the future expected scoring, and a NES is calculated for every game state. The NES for each game state may be determined based on an analysis of the events that have occurred in actual games in a particular sport over a predetermined time period in the past, such as, by way of example, three years. The NES for each game state may also be determined using techniques such as, forward simulations, random value assignments, and the like. The number of events analyzed for each specific situation—i.e., game state—needs to be sufficient to provide an adequate event pool for deriving a NES equation that receives as input the factors that describe a game state and produces a NES for the described game state. In some embodiments, each of the events in the event pool is analyzed to determine an expectation of the number of runs that should be scored—i.e., NES—for each game state. The NESs determined from the analysis of the event pool and their games states are then analyzed, for example, using any of a variety of well-known regression techniques, to derive a NES equation (e.g., linear regression equation, cubic regression equation, etc.) that outputs a NES for any game state. The derived NES equation may include constants, coefficients and/or variables whose values are based on the factors that describe the game state.

For example, in baseball, the number of events over a three year time span may amount to over 500,000 individual balls put in play and strikeouts. The 500,000-plus events are analyzed to determine the game states, and the game states are further analyzed to determine the NES for each game state. The determined NESs and their game states may be analyzed using any of the well-known regression techniques to derive a NES equation that is suitable for outputting a NES for each game state. A similar analysis can be performed for an adequate number of past events in other sports, such as football, basketball, etc., to determine a NES equation that is suitable for producing a NES for each game state that is based on the analyzed pool of past events.

In some embodiments, a NES for a game state may be an expectation of the number of runs that should be scored during a particular segment of a game. The appropriate game segment is dependent on the characteristics of the particular sport, and is generally based on the determination of the effect a game state has on the remainder of the game. For example, for baseball, a NES for a game state may be an expectation of the number of runs that should be scored during the inning in which the particular game state occurs. Here, the game segment is one inning—i.e., the inning in which a game state occurs—and this is based on the premise that game states do not carry-over from one inning to another, succeeding inning. For football, a NES for a game state may be an expectation of the number of points that should be scored on a current drive—i.e., the current offensive possession in which the particular game state occurs. Here, the game segment is the current drive, which is based on the premise that game states are not likely to impact drives other than the drive in which the particular game state occurred.

In some embodiments, the appropriate game segment for a game state may be determined based on the premise that the particular game state impacts a multiple number of successive possessions—e.g., multiple possessions in basketball, multiple possessions in football, etc. For example, for football, based on the effect of a play on a concept generally known as "field position," a change in game state may affect not only the current offensive team's drive in which the change in game state occurs but also the opponent's next drive, the next drive for the current offensive team, etc.

Each NES is an expectation of the runs that each game state is worth—i.e., the value of each game state. Then, for any given play, a NES is determined for the game state existing prior to the play (pre-play NES) and a new NES is determined for the game state that is created after the play (post-play NES), and the value of the play is the difference between the NES for the ending game state (post-play NES) and the NES for the beginning game state (pre-play NES) plus the runs generated on or by the play. In a situation where a number of plays follow each other in sequence, the post-play NES for a just completed play becomes the pre-play NES for the immediately succeeding play. Even though the score valuation term may vary based on the sport (i.e., "points" for basketball and football, "runs" for baseball, "goals" for hockey and soccer, etc.), for ease of explanation, NES will be used herein to refer to the unit of measure for the value of a game state irrespective of the actual sport and the sport's scoring method.

For example, in a particular baseball game between Team X and Team Y in Team Y's baseball stadium, Player A for Team X comes to the plate in the third inning of a tie game with Player P pitching for Team Y. There are no runners on base, and there is nobody out in the inning. Given this game situation and from the analysis of the past events, Team X can expect to score 0.54 runs in this inning from this point on. 0.54 is the NES for this game state. During this at bat—i.e., play,—Player A hits a single. At the end of the play, Player A is now on first base and there are still no outs in the inning. This is a positive result for Team X, and given this current game situation and from the analysis of the past events, Team X can now expect to score 0.91 runs in this inning from this point on. 0.91 is the NES for this new game state. Therefore, the value of the play—i.e., the total effect of the play—is +0.37 runs (i.e., 0.91−0.54).

Continuing the example, the next batter, Player B, comes up to bat with Player A still on first base and no outs in the inning. The NES for this game state is the 0.91 determined above. Player B strikes out during this at bat, leaving Player A on first base. The new game state is a base runner on first base with one out. This is a negative result for Team X, and given this current game situation and from the analysis of the past events, Team X can now expect to score 0.55 runs in this inning from this point on. 0.55 is the NES for this new game state. Therefore, the value of the play—i.e., the total effect of player B's strikeout—is −0.36 runs (i.e., 0.55−0.91). The next batter, Player C, comes up to bat with Player A still on first base and one out in the inning. The NES for this game state is the 0.55 determined above. Player C hits a double to the gap between left field and center field scoring Player A from first base. As a result of the play, one run scores and a base runner, Player C, is on second base with one out. This is a positive result for Team X, and given this current game situation—i.e., a base runner on second base with one out in the inning—and from the analysis of the past events, Team X can now expect to score 0.72 runs in this inning from this point on. 0.72 is the NES for this new game state. Therefore, the value of the play—i.e., the total effect of player C's double—is +1.17 runs (i.e., 0.72−0.55+1 run scored).

The NES concept can be similarly applied to other sports. For example, in a particular football game between the Rams and the Lions in the Lion's home stadium, the Ram's offensive unit may have possession of the football on first down-and-ten yards to go at their own 30 yard line in the first quarter. Given this game situation and from the analysis of the past events, the Ram's can expect to score 0.75 points during this offensive possession. 0.75 is the NES for this game state—e.g., a visiting team playing in the Lion's home stadium with the football on first down-and-ten yards to go at the visiting team's 30 yard line in the first quarter. On first-and-ten, the Ram's call a running play and their halfback runs the ball for 30 yards to the Lion's 40 yard line. As a result of this running play, the Ram's have the ball on first down-and-ten yards to go at the Lion's 40 yard line. This is a positive result for the Rams, and given this current game situation and from the analysis of the past events, the Ram's can now expect to score 1.4 points during this offensive possession. 1.4 is the NES for this new game state. Therefore, the value of the play—i.e., the total effect of the rush for 30 yards on first-and-ten to the opponent's 40 yard line—is +0.65 points (i.e., 1.4−0.75).

In basketball, an offensive possession may be considered a play. In auto racing, each lap of a race may be considered a play. In some embodiments, a play may occur each time a change in the race standings occur during an auto race. Similarly, in sports such as cycling, boat racing, etc. where the competitors race around a track or course multiple times to determine a winner, each lap of the race may be considered a play, or each time the standings change during the race may be considered a play. In duration races, such as the Tour de France, each leg of the race may be considered a play. In rugby, each change of possession may be considered a play. In volleyball, each point or "side-out" may be considered a play. In track-and-field, each heat, event, or trial may be considered a play.

In some embodiments, the valuation system determines in real-time values of plays occurring during games by identifying a play that occurred during a game. The system determines an expectation of scoring prior to the play, and an expectation of scoring that results from the play occurring—i.e., the expectation of scoring resulting after the play. The system then calculates a value of the play as the difference between the expectation of scoring that results from the play occurring and the expectation of scoring that existed prior to the play occurring, and any scoring generated by the play.

The various embodiments of the techniques for measuring the value or significance of each play throughout the course of a game in real-time and their advantages are best understood by referring to FIGS. 1-15 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a high-level block diagram showing an environment in which a valuation system may operate. The environment is only one example of a suitable operating environment and is not intended to suggest any limitation as to the scope of use or functionality of the valuation system. As depicted, the environment comprises a valuation system 102, a play-by-play feed provider 104, and a plurality of client systems 106, each coupled to a network 108. As used herein, the terms "connected," "coupled," or any variant thereof, means any connection or coupling, either direct or indirect, between two or more elements; the coupling of connection between the elements can be physical, logical, or a combination thereof.

In general terms, the valuation system provides real-time valuation of each play that occurs within a game as it relates to each play's effect on the outcome of the game. The valuation system analyzes a play-by-play game feed to calculate how each play impacts a team's scoring expectancy during the game or during appropriate segments of the game. The value of a play is the play's impact on the team's scoring expectancy. For example, if the team is expected to score 0.5 runs prior to a play, and the team is expected to score 0.7 runs after executing the play, the play's value is the difference in the team's scoring expectancy as a result of the play (i.e., 0.7−0.5=0.2).

In some embodiments, the valuation system distributes a play's value amongst some or all of the athletes identified as being involved in the play. In some embodiments, the valuation system provides users the ability to create and/or participate in an interactive fantasy sports challenge in which participants act as "investors," "traders," "coaches," "managers," etc., to form their own portfolio of athletes from among active real-life athletes, and in which a winner of the fantasy sports challenge is based in part on the value of the portfolio and the real-life athletes' performance as determined by the play valuation as described herein. Athlete valuation and fantasy sports challenges are further described below.

In some embodiments, the valuation system comprises a web server which functions to provide a web site that provides access to some or all of the features (i.e., services, functionality, data, etc.) provided by the valuation system. The web site may be identified and addressable by the hostname part of a uniform resource locator (URL). For example, the web site may provide a web page or multiple web pages, or other user interfaces (UIs) including graphical user interfaces (GUIs), through which users can obtain real-time valuation of plays during the course of a game. The users may also be able to obtain real-life athlete valuations based on the athlete's performance in a game based on the valuation of the plays occurring in the game. The web site may provide a web page or multiple web pages through which users can register and create/participate in interactive fantasy sports challenges, monitor the value of the portfolios, alter the composition of portfolios (e.g., buy/sell shares of financial instruments in real-life athletes), and perform other actions.

The play-by-play feed provider provides the play-by-play game feed to the valuation system. In some embodiments, the play-by-play feed provider sends the valuation system messages that contain the play-by-play game feed. For example, the play-by-play feed provider may provide the valuation system the live, play-by-play game event feed for football games, baseball games, basketball games, etc. Only one play-by-play feed provider is shown in FIG. 1 for simplicity and one skilled in the art will appreciate that there may be a plurality of play-by-play feed providers. For example, a play-by-play feed provider may provide the play-by-play real-time game event feed for the baseball games, another play-by-play feed provider may provide the play-by-play real-time game event feed for the football games, still another play-by-play feed provider may provide the play-by-play real-time game event feed for the basketball games, etc.

The client systems may include any type of computing system that is suitable for connecting to and accessing the valuation system. In some embodiments, each of the client systems has a web client computer program, such as any of a variety of well-known web browser programs suitable for connecting to and interacting with the valuation system.

The network is a communications link that facilitates the transfer of electronic content between, for example, the attached valuation system, play-by-play feed providers, and the client systems. In one embodiment, the network includes the Internet. It will be appreciated that the network may be comprised of one or more other types of networks, such as a local area network, a wide area network, a point-to-point dial-up connection, and the like. It will also be appreciated that the network may not be present. For example, the play-by-play feed provider and the valuation system may both reside on the same computing system and communicate via communication mechanisms, such as, interprocess communication, remote function call, internal communication buses, etc., typically supported on the computing system.

The computer systems on which the valuation system, the play-by-play feed provider, the client systems, and other components described herein can execute may include a central processing unit, memory, input devices (e.g., keyboard and pointing devices), output devices (e.g., display devices), and storage devices (e.g., disk drives). The memory and storage devices are computer-readable media that may contain instructions that implement the server application, client application, and other components. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the valuation system may be implemented in various operating environments that include personal computers, server computers, computing devices, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The valuation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
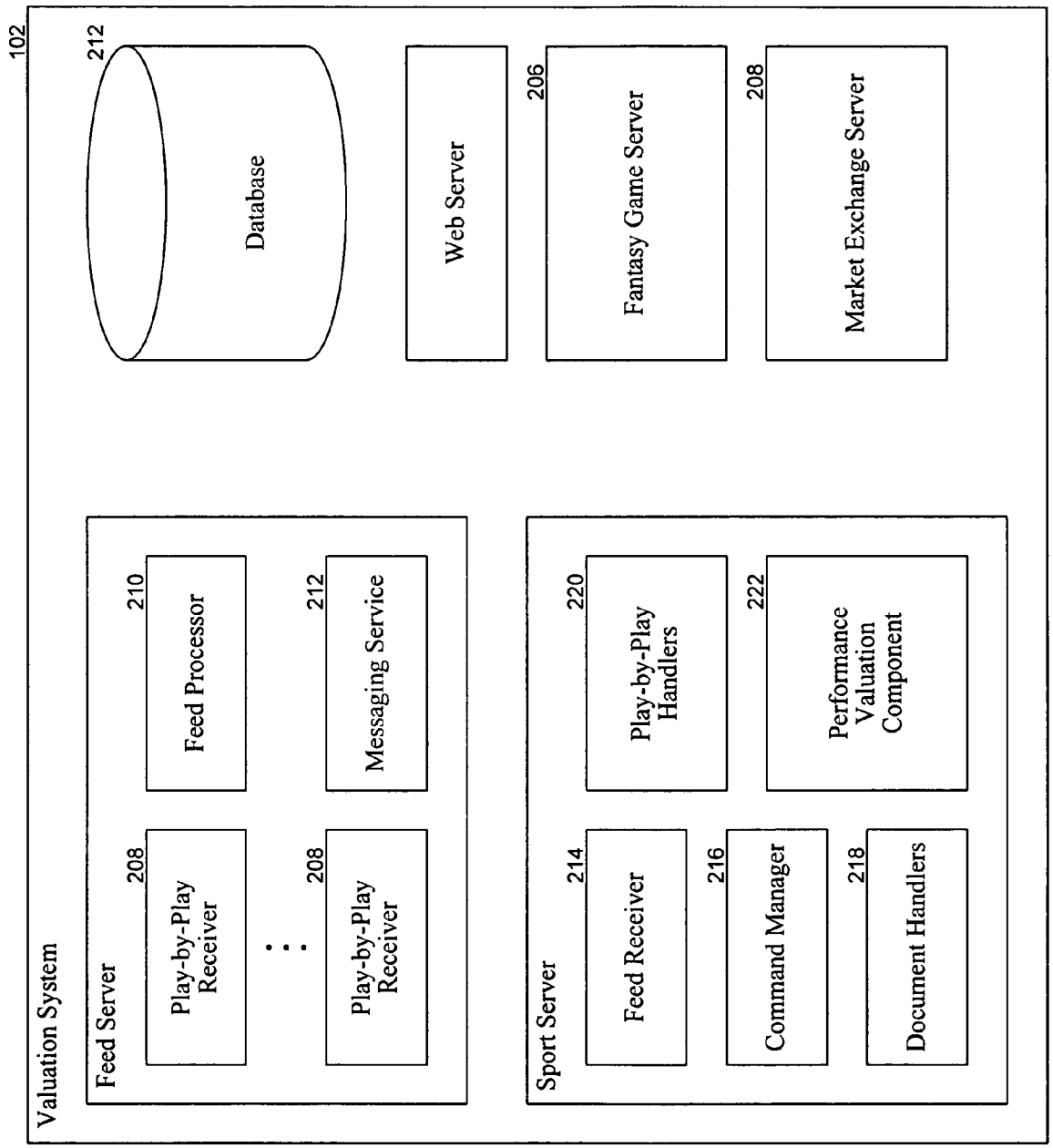
FIG. 2 is a block diagram illustrating selected components of the valuation system, according to some embodiments.

FIG. 2 is a block diagram illustrating selected components of the valuation system, according to some embodiments. As depicted, the valuation system comprises a feed server 202, a sport server 204, a fantasy game server 206, a market exchange server 208, a web server 210, and a database 212. In general terms, the feed server provides the external connectivity to the play-by-play feed providers to receive the play-by-play game feeds, transforms the received game feeds from the different data protocols to an internal format, such as XML, saves the received and transformed game feeds in the database, and forwards the transformed game feeds to the sport server for processing to determine, for example, individual play valuation, etc.

The feed server comprises a plurality of play-by-play receivers 208, feed processor 210, and a messaging service 212. The play-by-play receivers provide connectivity to, and receive from the play-by-play feed provider the play-by-play messages—i.e., game feeds. The feed server may create an instance of a play-by-play receiver for each play-by-play game event feed that is being received. The feed processor receives from the play-by-play receivers the messages received from the play-by-play feed provider, and transforms the messages into an internal format, such as XML. The feed processor stores the received messages and the XML messages in the database, and sends a copy of the XML messages—i.e., the XML format of the play-by-play game feeds—to the messaging service. The messaging service sends the received XML messages describing the play-by-play game feed to the sport server for processing.

In general terms, the sport server processes the XML play-by-play messages to determine a valuation for each play in real-time. The sport server comprises a feed receiver 214, a command manager 216, document handlers 218, play-by-play handlers 220, and a performance valuation component 222. The feed receiver receives the XML messages describing the play-by-play game feed from the messaging service component of the feed server. The command manager manages the multiple concurrent games by performing the necessary sequencing of the received XML play-by-play messages in order to ensure proper determination of game states. The document handlers parse the XML play-by-play messages. In some embodiments, the sport server maintains different document handlers for the different XML document types. For example, different document types may be used for the different types of play-by-play feeds—e.g., football, hockey, baseball, basketball, athlete statistics, etc.

The play-by-play handlers process the parsed XML play-by-play messages to create the game event objects. For example, the play-by-play handlers aggregate the play-by-play data with the sport and athlete data from the database to create the plays, game states, and performance events for the athletes involved in the play-by-play game events. The play-by-play feeds, instead of expressly identifying the athletes by name and/or describing the play, may identify the athletes and/or describe the play using unique identifiers. For these feeds, the play-by-play handlers dereference the identifiers contained in the XML play-by-play messages to identify the athletes and/or the play, as well as other information related to the description of the play that is contained in the XML messages. In some embodiments, the sport server maintains different play-by-play handlers for the different sports. The performance valuation component computes the value of each play that occurs within a game as it relates to each play's effect on the outcome of the game. In some embodiments, the value of each play is determined based on the game states of the current play and the previous play, and the corresponding NES for the two game states. The NES may be based on an expectation of the play based on an analysis of historical game states that occurred in actual games over a period of time.

In some embodiments, the performance valuation component valuates the performance of the individual athletes involved in a play by assigning positive or negative performance points according to their participation in the play. The performance points assigned to an athlete can be thought of as a "dividend" generated by the athlete as a result of the athlete's participation in a play. For example, the performance valuation component identifies the athletes involved in a play, and based on each individual athlete's contribution and situational expectation of the play, the performance valuation component appropriately divides the value of the play amongst the identified athletes. The value attributed to an athlete is the athlete's performance points or generated dividend.

In some embodiments, the performance valuation component breaks down a play into its intermediate states or components that represent the flow of the play, calculates a value for each intermediate state, identifies the athletes involved in each of the intermediate states and, for each intermediate state, appropriately distributes the value of the intermediate state amongst the athletes involved in the particular intermediate state. The intermediate states may correspond to athlete performance events which are discrete, measurable components of the play. For example, for baseball, the athlete performance events may include the interactions between pitcher and hitter (e.g., pitcher pitching and the batter hitting), the batted ball and fielder (e.g., the fielder fielding a batted ball), the fielder and base runner (e.g., the base runner advancing and the fielder preventing the base runner from advancing), etc. For football, the athlete performance events may include the quarterback and receiver (e.g., quarterback throwing a pass and the receiver catching the pass), the receiver and defensive back (e.g., the receiver running after catching a pass and the defensive back defending the pass and tackling the receiver), etc.

The intermediate states have corresponding game states, and the series of game states represent the play from its beginning game state to its ending game state. The performance valuation component determines a value for an intermediate state from the intermediate NESs associated with the intermediate states. The performance valuation component determines an expectation of the each intermediate state based on the characteristics of the intermediate state. The expectation of the intermediate state is a probability of outcomes for the intermediate state determined from, for example, an analysis of the events and, in particular, an analysis of the intermediate states of the events that have occurred in actual games. The expectations of the intermediate states may be maintained in a table of relative probabilities in the database. The performance valuation component determines an intermediate NES based on the expectation of the inter-mediate state. The performance valuation component determines another intermediate NES based on the actual result of the intermediate state and calculates a value for the intermediate state using the two intermediate NESs. The performance valuation component identifies the athletes involved in the intermediate state and appropriately distributes the calculated value of the intermediate state amongst the athletes involved in the intermediate state. Each athlete's proportion of the calculated value is the athlete's performance points or dividend generated as a result of the athlete's participation in the intermediate state of the play. The performance valuation component similarly repeats this process for the subsequent intermediate states of the play as necessary.

In some embodiments, the performance valuation component may calculate a value for a play without breaking the play down into its intermediate states. In this instance, the performance valuation component may distribute the calculated value amongst the athletes involved in the play without taking into consideration various aspects of the play, such as, by way of example, defense, base running, etc. This allows for a simpler distribution of the play's value amongst a potentially smaller number of athletes.

In general terms, the fantasy game server hosts the interactive fantasy sports challenges. The fantasy game server allows registered users to act as "challenge creators" and create custom fantasy sports challenges. The fantasy game server may also provide fantasy sports challenges. For example, a fantasy sports administrator may act as a challenge creator and create fantasy sports challenges which the registered users can participate in. Registered users, including challenge creators, can then participate in one or more fantasy sports challenges.

In some embodiments, participants of a fantasy sports challenge may be allowed to buy, sell, swap, discard, win, give away, steal, lose, trade or otherwise acquire or divest financial instruments (or "various instrument vehicles") in athletes. For example, financial investments may be comprised of shares of individual athletes, mutual funds of athletes, index fund of athletes, and other types of financial instruments comprised of interests in athletes. Shares of an athlete represent an equity interest in the athlete and a right to dividends generated by the athlete's on-field performance. A mutual fund invests in a diversified group of athletes, and a share of the mutual fund effectively represents an equity interest in each of the underlying athletes. The mutual fund's underlying securities may be traded, realizing a gain or loss, and the fund collects the dividend. The investment proceeds are then passed along to the individual participant investors. An index fund may hold a portfolio of athletes' shares designed to match the price and dividend performance of the entire market or one of its sectors, and a share of the index fund effectively represents an equity interest in each of the underlying athletes. The index fund's underlying securities may be traded, realizing a gain or loss, and the fund collects the dividend. The investment proceeds are then passed along to the individual participant investors.

In some embodiments, the fantasy game server interacts with the other components of the valuation system to enable the participants of fantasy sports challenges to establish their portfolios comprising of shares of financial instruments in real-life athletes, alter the composition of their portfolios by trading—i.e., buying and/or selling—the shares of the financial instruments, and perform other actions associated with participating in the interactive fantasy sports challenges. The fantasy game server also receives information from the other components of the valuation system to determine the value of the portfolios during the course of the interactive fantasy sports challenges and, at the end of a challenge, determines the ending value of the portfolios that are participating in the challenge. In some embodiments, the fantasy game server determines a value of a portfolio based on the market value of the shares of financial instruments contained in the portfolio and the dividends accrued by the shares of financial instruments during the duration of the interactive fantasy sports challenge. Interactive fantasy sports challenges are further discussed below.

In general terms, the market exchange server facilitates the trading and selling of shares of financial instruments. In some embodiments, the market exchange server functions as a "market maker" in that the market exchange server buys/sells shares of financial instruments from/to the users of the valuation system, such as the participants of the interactive fantasy sports challenges. In some embodiments, the market exchange server establishes an initial public offering (IPO) price for a share of each financial instrument. The market exchange server may establish the IPO price for a share of a financial instrument in an athlete based on an expectation of that athlete's expected performance in games (e.g., the expected performance points or dividends) during the course of the athlete's career. In some embodiments, the market exchange server sits at the end of each buy/sell transaction and adjusts the price of the shares to create a constant trade balance between buying and selling (also referred to herein as "buy-sell pressure"). The market exchange server attempts to achieve a constant trade balance by adjusting the price of the shares accordingly.

In general terms, the web server functions to provide a web site through which users can access some or all of the features provided by the valuation system. For example, the web server may provide web pages through which users can register and interact with the valuation system to: obtain/view real-time valuation of plays occurring in a game; obtain/view athlete valuations based on the athlete's performance in a game; participate in interactive fantasy sports challenges; monitor the value of their portfolios; alter the composition of their portfolios by buying/selling shares of financial instruments in real-life athletes; and perform other actions supported by the valuation system.

In some embodiments, the valuation system may provide the NES to various media outlets, such as, television networks, cable networks, radio networks, satellite networks, and other media providers, for use by the media outlets. By way of example, a television network, such as, by way of example, ESPN, might enter into a license agreement to receive the NES from the valuation system and display the NES on its web site. ESPN may then display the received NES within the context of the game (e.g., video feed of the game) for which the NES applies. For example, during the video feed of a game, ESPN might display the NES prior to each play during the game to provide viewers a projected scoring expectation or value prior to each play actually occurring during the game. In some embodiments, the valuation system may broadcast the NES via its own web site in a similar manner. In some embodiments, the valuation system may provide or make available the NES on a subscription basis. For example, one or more individuals desiring to receive and use the NES may subscribe to receive the NES. For example, a subscriber may receive and use the NES to perform his or her own analysis of athletes.

In general terms, the database functions as a repository for the data and information used by the components of the valuation system to facilitate the real-time valuation of each play that occurs within a game as disclosed herein. For example, the database may represent and/or store information and data such as the live play-by-play game feeds, the XML documents that correspond to the plays in the game feeds, historical game data, the game states and the factors corresponding to the game states, the text description of the plays, the NES coefficients that are used in the NES equation for athlete performance valuation in a given play, etc. In some embodiments, the database may be implemented using a SQL server.

In some embodiments, the database functions as a repository for the data and information used by the components of the valuation system to facilitate the valuation of athletes. For example, the database may store the probabilistic models generated from the historical game data, the athlete valuation distribution tables, and other information used to assign athletes performance points or dividends. In some embodiments, the database functions as a repository for the interactive fantasy sports challenge data and the market data.

The aforementioned components of the valuation system are only illustrative and are not intended to suggest any limitation as to the implementation of the illustrated components and/or the scope of use of the valuation system. For example, in various embodiments, one or more of the components of the feed server may be implemented as components of the sport server. Moreover, the valuation system may not include one or more of the depicted components or may include other components and modules not depicted. Furthermore, the functionality provided for in the components and modules may be combined into fewer components and modules or further separated into additional components and modules.

In the discussion that follows, embodiments of the valuation system are described in conjunction with a variety of illustrative examples. It will be appreciated that the embodiments of the valuation system may be used in circumstances that diverge significantly from these examples in various respects.

Play Valuation

Figure 3:
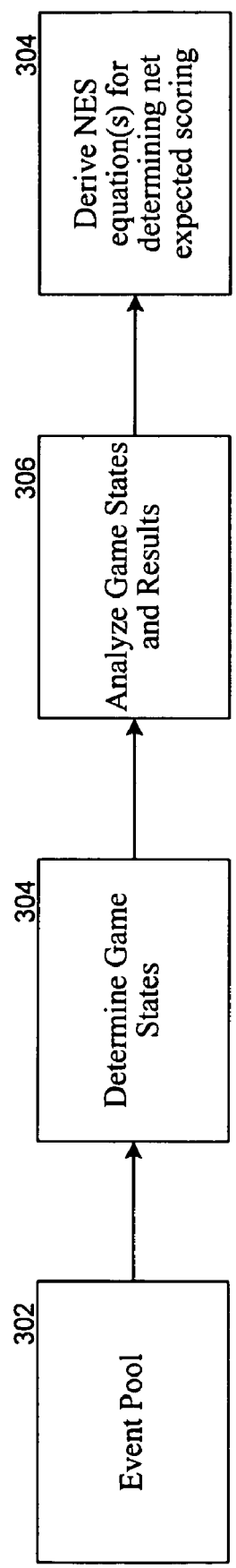
FIG. 3 is a block diagram illustrating the derivation of a NES equation for determining the net expected scoring, according to some embodiments.

FIG. 3 is a block diagram illustrating the derivation of a NES equation for determining the net expected scoring, according to some embodiments. In block 302, an event pool is created. The event pool is a comprehensive database of the events that have occurred in real games—e.g., real football games, real baseball games, etc.—over a predetermined period of time. The events in the event pool are of a sufficient number to determine the expected scoring—i.e., the average number of runs that should be scored—for the game states represented by these events.

In block 304, the games states corresponding to the events in the event pool are determined, for example, from the conditions that describe the events. In block 306, the game states are analyzed to determine their results. For example, the result may be the number of points that is generated in the segment of the game affected by a game state. In block 308, the game states and their corresponding results are analyzed to derive one or more NES equations suitable for determining the net expected scoring for a game state. In some embodiments, the game states and their corresponding results may be analyzed using weighted least squares regression.

For example, analyzing the game states and their results in a baseball event pool using the above regression technique may generate the following NES regression equation for baseball:

$$NES=F(N1,N2,N3,N4,N5,N6,N7,N8,N9,N10,N11,N12) \quad [1]$$

N1—NUMOUTS (the number of outs)
N2—Inning (Boolean variable)
N3—Lineup position (lineup position of the current of batter)
N4—Homeaway (1 if batter is home, 0 if batter is visitor)
N5—League of the game (1 for AL, 0 for NL)
N6—Offense score (total score in the game of team at bat)
N7—Opposite hand (Handedness matchup: are batter and pitcher the same hand: 0 if yes, 1 if not)
N8—Is the batter a pinchhitter (1 if yes, 0 if not)
N9—Pitchcount (# of pitches thrown)
N10—Runner on 1 (1 if yes 0 if no)
N11—Runner on 2 (1 if yes 0 if no)
N12—Runner on 3 (1 if yes 0 if no)

The NES for baseball is primarily dependent upon NUMOUTS (i.e., the number of outs in the inning) and the configuration of the runners on base (e.g., Runner on 1 st, Runner on 2nd, Runner on 3rd all take the value of 1 if a runner is on that base and 0 otherwise). NES is also dependent, though less so, on the league the game is played in (e.g., League=1 if it is an American League game 0 otherwise), whether the home team is at bat (e.g., Home is 1 if the home team is at bat and 0 otherwise), the inning of the game (e.g., $1^{st}$ inning, $9^{th}$ inning and extra innings are all 1 if in that inning and 0 otherwise), the position in the lineup of the batter (e.g., Lineup position is equal to the number of the batter in the batting order), the number of runs scored by the offense (e.g., Offense score), whether the pitcher and batter are of opposite hand (e.g., opposite hand is 1 if they are opposite and 0 otherwise), whether the batter is a pinch hitter (e.g., 1 if the batter is a pinch hitter and 0 otherwise), the number of pitches thrown by the pitcher in the game (i.e., pitchcount) and the park that game is played in (e.g., each park has a unique score that either increases or decreases NES based on the correlation of the park with total runs scored).

The values for the above variables are determined based on the factors that describe a game state, and inputting values for the variables as determined from the factors that describe the game state into equation [1] produces a NES for the particular game state. Table 1 below illustrates example NES outcomes generated using equation [1] for a particular combination of factors and the listed game states or situations (i.e., combination of the number of outs and the position of the base runners) for a particular baseball stadium or park.

TABLE 1

| Runner on | NES | | |
|---|---|---|---|
| | 0 out | 1 out | 2 out |
| 0 | 0.534 | 0.348 | 0.165 |
| 1B | 0.930 | 0.540 | 0.290 |
| 2B | 1.143 | 0.642 | 0.356 |
| 3B | 1.409 | 0.767 | 0.437 |
| 1B, 2B | 1.564 | 0.840 | 0.484 |
| 1B, 3B | 1.841 | 0.968 | 0.566 |
| 2B, 3B | 2.073 | 1.074 | 0.634 |
| 1B, 2B, 3B | 2.533 | 1.281 | 0.765 |

Similar tables can be generated for the other combinations of the factors and for the other baseball stadiums or parks. In some embodiments, one or more variables (i.e., factors) listed above may be omitted in calculating the NES.

In the case of football, a game state may be described by a number of primary factors and a number of other less significant factors. The primary factors may include the down, yards to go for a first down, and yards away from the goal, and their effects on the expectation of scoring are predictable—e.g., each is more favorable for points being scored when it is lower (first down is better than third down, and closer to the first down or the end zone is better than farther away). Other factors that are less central to the value of a play, but which may still contribute in determining the value of the play may include, for example, time remaining, score and score differential, whether or not the team is at home or away, what the surface of the field is (with turf being more conducive to scoring than grass), and the weather (measured through humidity and temperature). Any of a combination of these variables may be included in a regression equation to determine how many points the offensive team was expected to score prior to the play. After the play, the expectation is calculated again, using the new down, yards to go, and so forth. The expectation prior to the play is subtracted from the expectation after the play to arrive at the NES of that particular play.

Analyzing the game states and their results in a football event pool using the above regression technique may generate the following NES regression equation for football:

$$NES=(N1+N2+N3+N4+N5+N6+N7+N8)*N9 \quad [2]$$

The variables in equation [2] have the following meanings:
N1—Gives the number of points on the play (for all touchdowns, the number is 7, based on the premise that the extra point or two point conversion is not related to the play)
N2—Change in expectation (expected scoring) due to the play on the current drive
N3—Change in expectation (expected scoring) on the opponent's ensuing drive (if the current play is not a change of possession)
N4—Change in expectation (expected scoring) on the opponent's ensuing drive (if the current play is a change of possession)
N5—Change in expectation (expected scoring) on the offensive team's next drive (if the current play is not a change of possession)
N6—Change in expectation (expected scoring) on the offensive team's next drive (if the current play is a change of possession)
N7—If the play is a rush on $3^{rd}$ and 10 or more, then this variable is 0.27, otherwise it is 0
N8—Fumble adjustment (positive if the fumble is lost and negative if the fumble is recovered, based on the premise that the outcome of a fumble is essentially random, and the fumbler should not be punished excessively if the fumbler's teammates do not recover the fumble)
N9—Is a 1 if the play is not a hail mary interception, kneel down, or spike, otherwise, it is a 0

The values for the above variables are determined based on the factors that describe a game state, and inputting values for the variables as determined from the factors that describe the game state into equation [2] produces a NES for the game state.

In equation [2], because the value of the N9 variable is 1 on normal plays, it has no effect on most plays. There are some plays, however, where players perform acts that are generally considered negative but, in context, are either beneficial or at least not harmful to the team. For instance, a hail mary at the end of a game may be the only way for a team to get the score it requires to tie or win the game. If this play is intercepted, negative value should not be assigned to the play nor should negative credit be given to the player—i.e., quarterback—who threw the interception, since this play did not hurt the team's chances of winning. Therefore, the N9 variable is 0 in this case, which makes the entire play value 0 as well. This is also the case for kneel downs at the end of the game to run the clock out and intentionally grounded passes—i.e., spikes—to stop the clock.

The variables N3-N6 in equation [2] account for the concept of field position in football. While moving the ball from a team's own twenty yard line to midfield and then punting does not result in any points on this drive for the team, it lessens the opponent's chances of scoring on their ensuing drive. The effects of the current play on the opponent's following drive are taken into account by the variables N3 and N4 in equation [2]. Beyond the opponent's next drive, the effects of the current play on the current offensive team's next drive are taken into account by the variables N5 and N6 in equation [2] in a similar manner. Therefore, in the valuation system, the value of a football play is the play's cumulative effect on the expectation of scoring on the current drive (variable N2), the opponent's ensuing drive (variables N3 and N4), and the drive after that (variables N5 and N6).

One factor in determining the value of the variables N2-N6 (the change in expected scoring) in equation [2] is the position on the field of play—i.e., the yards from goal. The yards from goal of the offensive team's current drive, which is needed to determine a value for variable N2, can be readily determined from the current game state. The expected yards from goal of the opponent's ensuing drive, which is needed to determine values for variables N3 and N4, and the current offensive team's next drive, which is needed to determine values for variables N5 and N6, may be determined from an analysis of the game states in the event pool. A regression analysis of the game states in the event pool may generate the following cubic regression equation for calculating the expected yards from goal of the opponent's next drive and the expected yards from goal of the current offensive team's next drive:

$$\text{Expected Yards From Goal} = 70.79 + 0.0164x + 0.0039x^2 + 0.0006x^3 \quad [3]$$

where x=the current drive's yards from goal when calculating the expected yards from goal of the opponent's next drive; or the opponent's expected yards from goal when calculating the expected yards from goal of the current offensive team's next drive.

In addition to the yards from goal or expected yards from goal factor, the values for variables N3-N6 in equation [2] may be determined from one or more additional factors that describe the game states. For example, a regression analysis of the game states in the event pool may generate one or more regression equations for calculating values for these variables. By way of example, the regression formula for determining the value of N3 may include variables and coefficients for the variables such as, the number of yards from the goal line, the current down, the number of yards to go to gain a first down, the time remaining in the half or game, weather conditions (e.g., temperature and humidity), home field factor, type of playing surface, etc.

Figure 4:
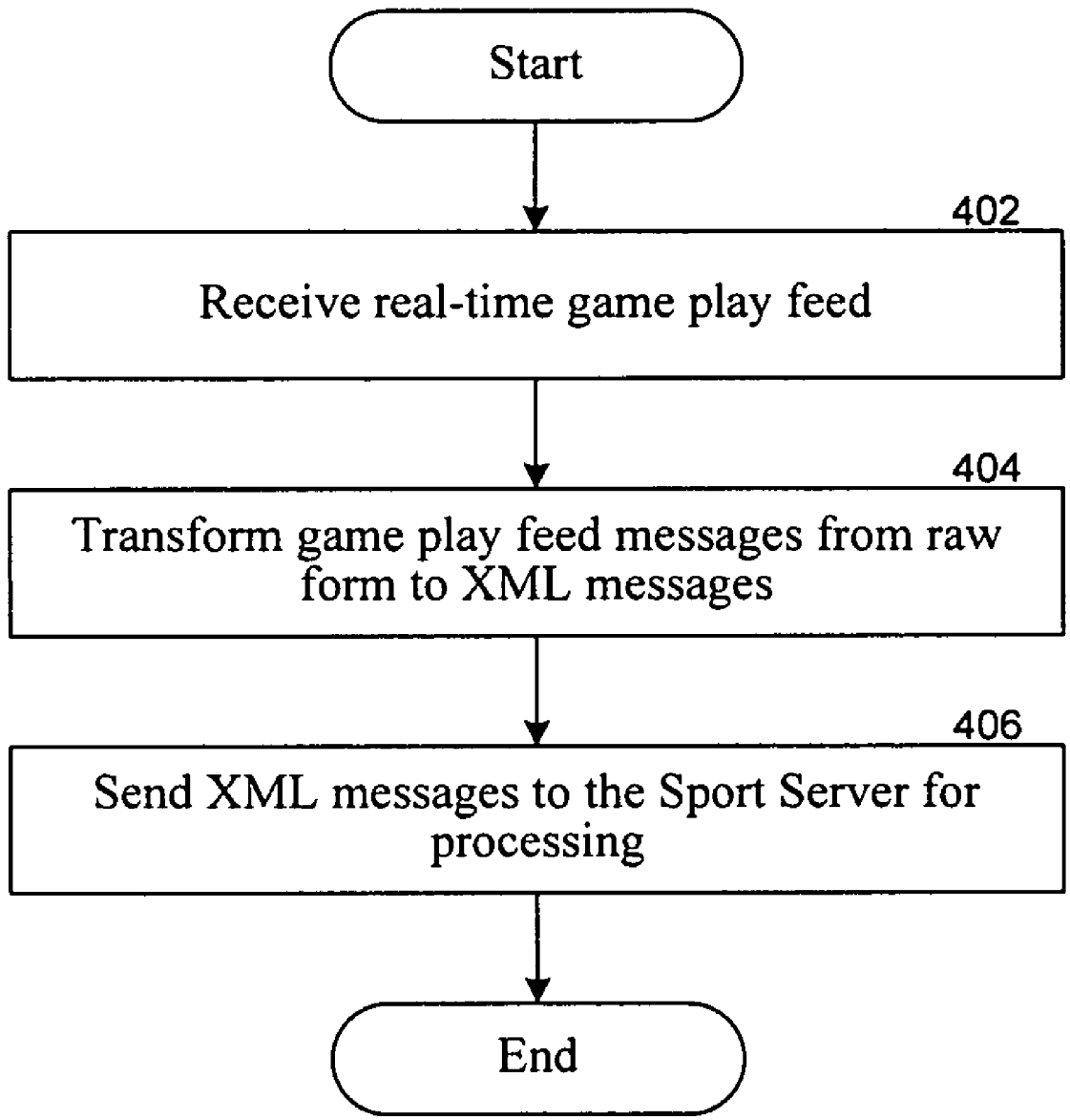
FIG. 4 is a flow diagram illustrating the processing of the feed server of the valuation system, according to some embodiments.

FIG. 4 is a flow diagram illustrating the processing of the feed server of the valuation system, according to some embodiments. By way of example, a play-by-play feed provider may start feeding real-time play-by-play game events for a game, such as a baseball game, a football game, a basketball game, etc. In block 402, the feed server receives the real-time game play feed. The feed server may receive the play feed in a series of event messages. In block 404, the feed server transforms the game play feed messages from their raw form—i.e., the protocol used by the play-by-play feed provider—to XML format—i.e., XML messages. The feed server may save the raw messages and the transformed, XML messages in the database. In block 406, the feed server sends the XML messages to the sport server for processing of the received play-by-play game event.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 5:
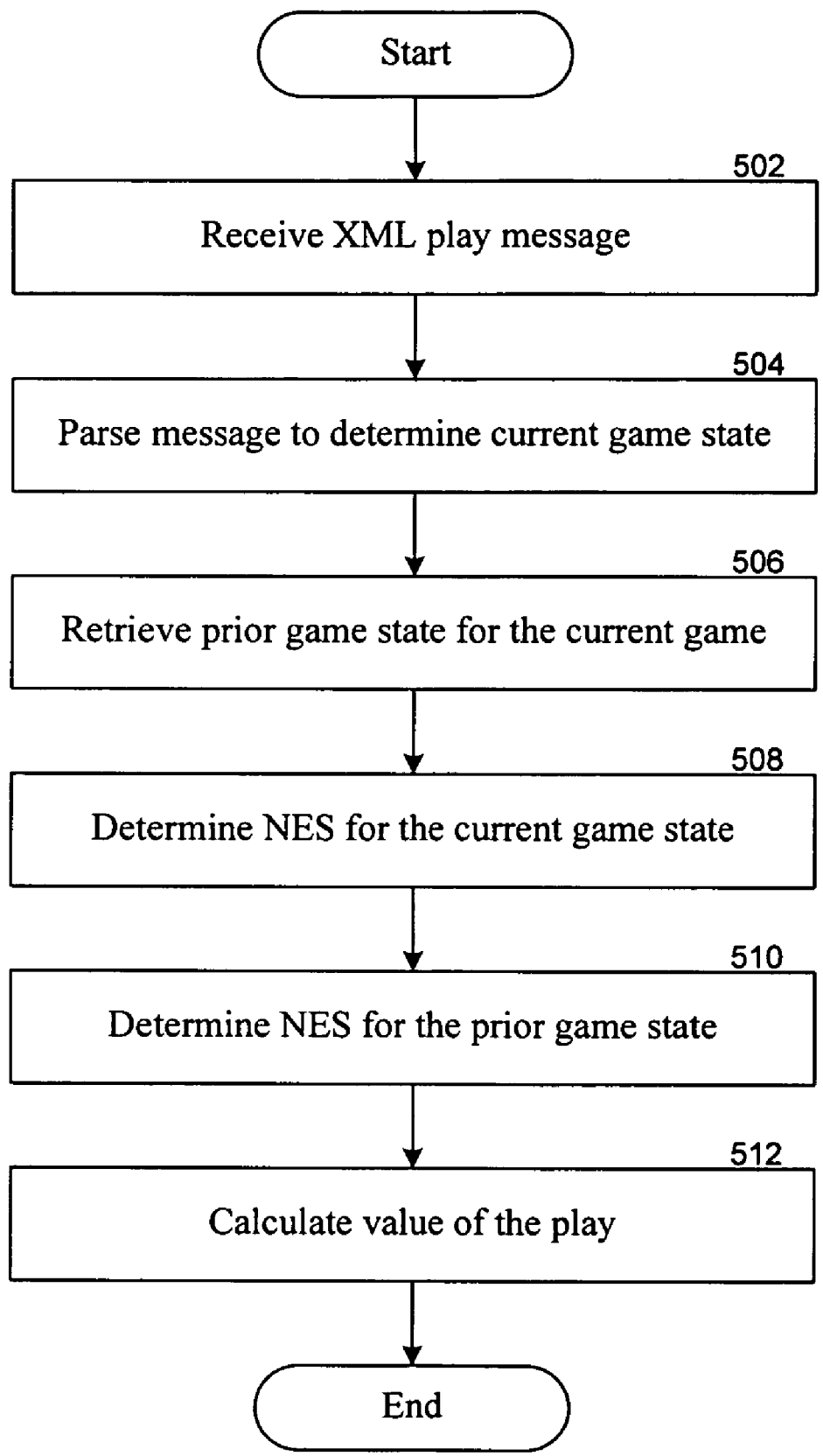
FIG. 5 is a flow diagram illustrating the processing of the sport server of the valuation system to determine a value of a play, according to some embodiments.

FIG. 5 is a flow diagram illustrating the processing of the sport server of the valuation system to determine a value of a play, according to some embodiments. In block 502, the sport server receives the XML play message. The sport server may sequence the XML message to maintain proper game states and sequence of game states. In block 504, the sport server parses the XML message to determine the play and the current play's game state. Depending on the contents of the XML message, the sport server may need to aggregate the data in the XML message with data from the database in order to determine the current game and current play's game state. In block 506, the sport server retrieves the prior play's game state (i.e., game state existing prior to the current play) for the current game from, for example, the database. The sport server then determines a NES for the current play's game state (i.e., game state resulting from or after the current play occurring) in block 508, and a NES for the prior play's game state in block 510. The NES for the game state may be determined using one or more NES regression equations, such as equations [1] and [2] above for baseball and football, respectively, which were derived from an analysis of events—i.e., game states—that have occurred in past games. In block 512, the sport server calculates a value for the play using the NESs for the current and prior game states. The sport server may save the current play game state and its NES in the database.

In some embodiments, the NES may be based on simulation. For example, a model may be created where individuals (athletes) or groups (teams) participating in a game would be represented by "agents." These agents can then be given different characteristics that represent different attributes and skill levels. The outcome of a game or a game situation can then be simulated, for example, using a computing device, and this result may be used to determine the expected scoring.

Football Play Valuation Example

Team W is on offense and has the ball at its own 40 yard line in the first quarter of a tie game at home versus Team D. The current down and distance is first-and-ten. Based on this situation—i.e., game state—and from, for example, equation [2] above: Team W is expected to score 2.2 points on its current drive; Team D is expected to score 1.5 points on its next drive; and Team W is expected to score 1.6 points on its next drive.

On Team W's next play, its quarterback throws a pass to its halfback for a seven yard gain, bringing up second-and-three from its own 47 yard line. Based on this new game state: Team W is now expected to score 2.6 points on its current drive; Team D is expected to score 1.3 points on its next drive; and Team W is expected to score 1.7 points on its next drive.

The value of the just completed play—i.e., the seven yard reception—is the sum of the difference of the scoring expectations before and after the play for Team W's current drive, Team D's next drive, and Team W's next drive. In this example, the value of the play is +0.70 points ((2.6−2.2)+

(1.5−1.3)+(1.7−1.6)). Of note is that the reduction in the scoring expectations of the opposing team, Team D, is considered favorable to the current offensive team, Team W.

Baseball Play Valuation Example

During a game between Team A and Team B being played in Team A's ballpark, Player JD of Team A comes up to bat in the third inning against Player MM. Player BM of Team A is on first base and there is one out in the inning. Based on this game state and from, for example, equation [1] above, the NES for this game state is 0.54 runs.

During the at bat, Player JD hits a hard line drive just off the right field line resulting in a double. Player BM, who was on first base actually scores, and Player JD ends up on second base. As a result of the double by Player JD, the current game state is a man on second base with one out and one run scored. The NES for this game state is 1.64 runs (NES of 0.64 for the game state of a man on second base with one out +1 run scored). The value of the play is 1.1 runs (1.64 runs-0.54 runs).

Distribution of Performance Points to Athletes Based on the Value of a Play

Figure 6:
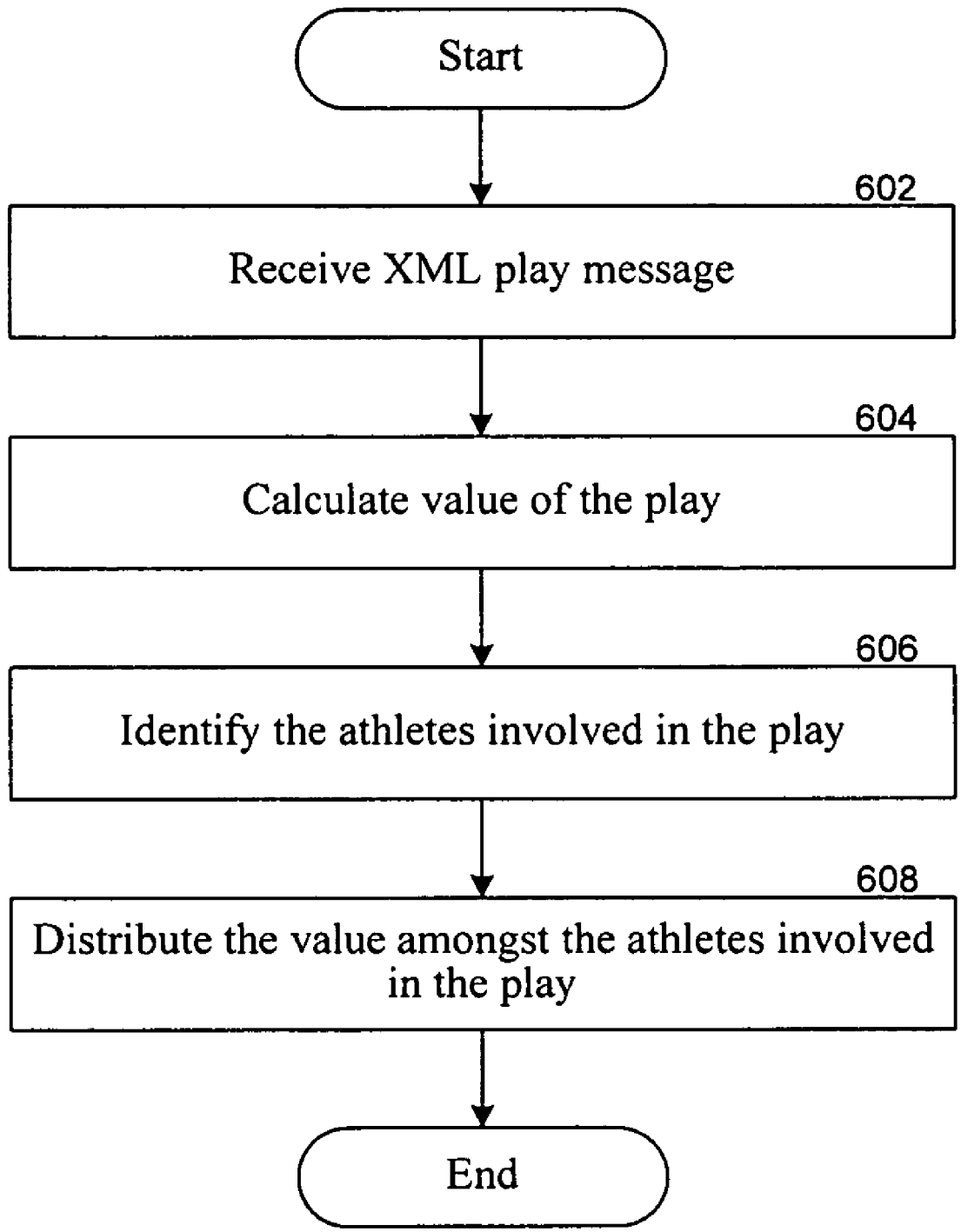
FIG. 6 is a flow diagram illustrating the processing of the sport server of the valuation system to distribute the value of a play amongst the athletes involved in the play, according to some embodiments.

FIG. 6 is a flow diagram illustrating the processing of the sport server of the valuation system to distribute the value of a play amongst the athletes involved in the play, according to some embodiments. In block 602, the sport server receives from the feed server the XML play message. In block 604, the sport server parses the XML play message to determine the play, current play's game state, prior play's game state, and calculates a value of the play. In some embodiments, the processing of the sport server in blocks 602 and 604 is similar to the processing of the sport server in blocks 502 to 512 of FIG. 5.

In block 606, the sport server identifies the athletes who were involved in the play. The athletes may be identified in the XML play message. In block 608, the sport server distributes the value of the play calculated in block 604 amongst the identified athletes who were involved in the play as, for example, performance points or dividends generated by each share of a financial instrument in each identified athlete. In some embodiments, the value is distributed amongst the athletes according to relevant percentages as determined from an analysis of past events in the event pool using, for example, well known empirical and regression techniques.

For example, for baseball, for a play involving a pitcher and a batter (e.g., strikeout, base on balls, or a home run), the empirical analysis of the past events may indicate that the pitcher is to be credited with 38% of the value of the play, and the batter is to be credited with 62% of the value of the play. Assuming the value of the play is 1.00 (e.g., a home run), the batter is credited with 0.62 performance points (a gain of 0.62 performance points) and the pitcher is debited 0.38 performance points (a reduction of 0.38 performance points). In the prior football example where the pass play from the quarterback to the halfback resulted in a value of +0.70 points, the empirical analysis of the past events may indicate that the quarterback and the halfback are each to be credited with 50% of the value of the play. Here, the quarterback and halfback are each credited with 0.35 performance points. One skilled in the art will appreciate that distribution percentages for other sports, other types of plays, and/or other athletes may be obtained in a similar manner by analyzing the events in the event pool for the particular sport.

Figure 7:
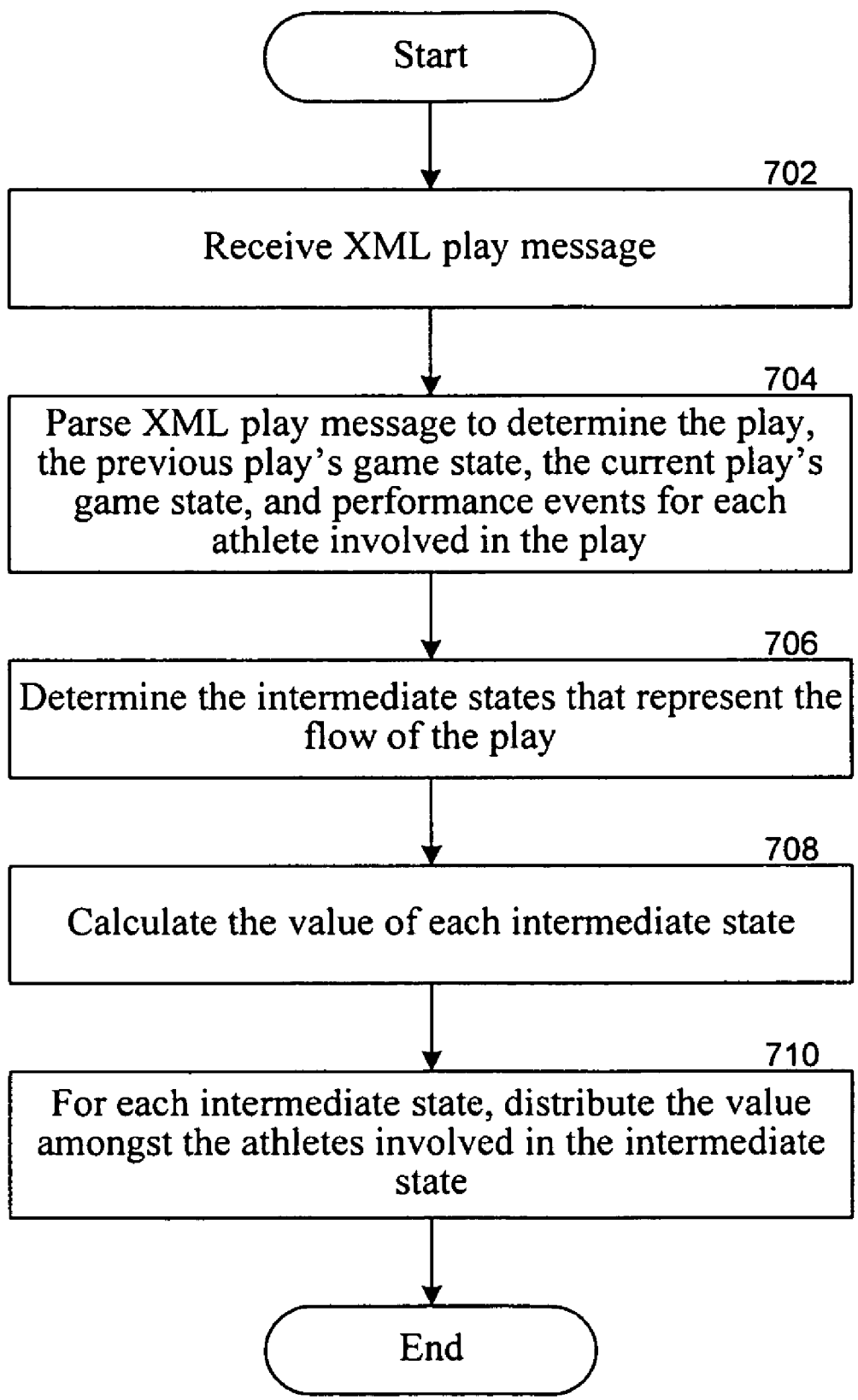
FIG. 7 is a flow diagram illustrating the processing of the sport server of the valuation system to distribute the value of a play amongst the athletes involved in the intermediate states of the play, according to some embodiments.

FIG. 7 is a flow diagram illustrating the processing of the sport server of the valuation system to distribute the value of a play amongst the athletes involved in the intermediate states of the play, according to some embodiments. In block 702, the sport server receives from the feed server the XML play message. In block 704, the sport server parses the XML play message to determine the play, the previous play's game state, the current play's game state, and performance events for each athlete involved in the play. The performance events may vary depending on the sport. For example, for baseball, the performance events may include pitching, hitting, fielding, base running, etc. For football, the performance events may include passing, receiving, rushing, tackling, etc.

In block 706, the sport server determines the intermediate states that represent the flow of the play. The intermediate states may divide the play into steps or stages that isolate the individual contributions of the athletes involved in the play. For example, for baseball, if the play is a batted ball, the intermediate states may be: (1) the estimated result of the batted ball; (2) the actual result of the batted ball; (3) the estimated base running result due to the batted ball; and (4) the final result of the batted ball, including the actual base running that occurred.

In block 708, the sport server calculates the value of each intermediate state determined in block 706. In a manner similar to calculating a value of an entire play, a value of an intermediate state may be calculated from the NES of the prior intermediate state and the NES of the current intermediate state. In the case where an intermediate state involves an expected result, the NES of the intermediate state may be calculated using relative probabilities of the possible or expected outcomes or results of the intermediate state. In some embodiments, the relative probabilities of the possible results may be calculated empirically from an analysis of the past events in the event pool.

For example, for baseball, the hit characteristics of a batted ball may include power, direction, type, and distance, as follows:

Power: Soft, Medium, Hard

Direction: Field divided into seven zones or slices originating outward from home plate Type: Line Drive, Grounder, Pop Up, Fly Ball, Bunt, etc.

Distance: Distance from home plate in feet

A probabilistic model that calculates expected at bat and base running outcomes based on the batted ball hit characteristics may be created from an analysis of the events in the event pool. Table 2 below illustrates an example batted ball probabilistic model for line drives landing between 200-250 feet.

TABLE 2

| | Zones | | | | | | |
|---|---|---|---|---|---|---|---|
| | 1 | 2 | 3 | 4 | 5 | 6 | 7 |
| Out | 2% | 18% | 11% | 14% | 7% | 22% | 5% |
| 1B | 29% | 75% | 76% | 84% | 80% | 74% | 33% |
| 2B | 69% | 6% | 12% | 2% | 11% | 4% | 56% |
| 3B | 0% | 0% | 1% | 0% | 3% | 0% | 6% |

Batted ball probabilistic models that calculate the expected outcomes for the other combinations of the characteristics of the batted ball may similarly be created from an analysis of the events in the event pool.

Table 3 below illustrates an example base runner advancement probabilistic model illustrating the probability of scoring from third base on a fly ball of a particular distance.

TABLE 3

| | Distance (feet) | | | | | |
|---|---|---|---|---|---|---|
| Zone | <150 | 150-200 | 200-250 | 250-300 | 300-350 | >350 |
| 1 | 0% | 13% | 69% | 98% | 100% | 100% |
| 2 | 0% | 20% | 69% | 98% | 100% | 100% |
| 3 | 0% | 15% | 67% | 98% | 100% | 100% |
| 4 | 0% | 16% | 69% | 96% | 100% | 98% |
| 5 | 8% | 23% | 72% | 98% | 100% | 100% |
| 6 | 0% | 12% | 57% | 94% | 100% | 100% |
| 7 | 0% | 23% | 71% | 94% | 100% | 100% |

Base runner advancement probabilistic models that calculate the expected base runner advancement outcomes for the other combinations of the characteristics of the batted ball and base runner positions may similarly be created from an analysis of the events in the event pool. In some embodiments, batted ball probabilistic models and the base runner advancement probabilistic models may be generated for each of the different base ball stadiums or parks.

In block 710, the sport server identifies the athletes who were involved in each of the intermediate states of the play, and distributes the value of each intermediate state amongst the athletes involved in the intermediate state as, for example, performance points or dividends generated by each share of a financial instrument in each identified athlete.

One skilled in the art will appreciate that probabilistic models similar to those illustrated above for baseball may be similarly created for the various other sports such as football, basketball, hockey, golf, auto racing, etc. For example, in golf, one probabilistic model may indicate the probabilities of obtaining various scores on a particular par 4 hole after hitting a second shot into a green-side bunker. In auto racing, one probabilistic model may indicate the probabilities of obtaining various finish positions for various states in the race (e.g., driver is currently in third position, 5 seconds behind the second position car and 12 seconds behind the first position car on lap 100 of a 200 lap race, etc.).

Figure 8:
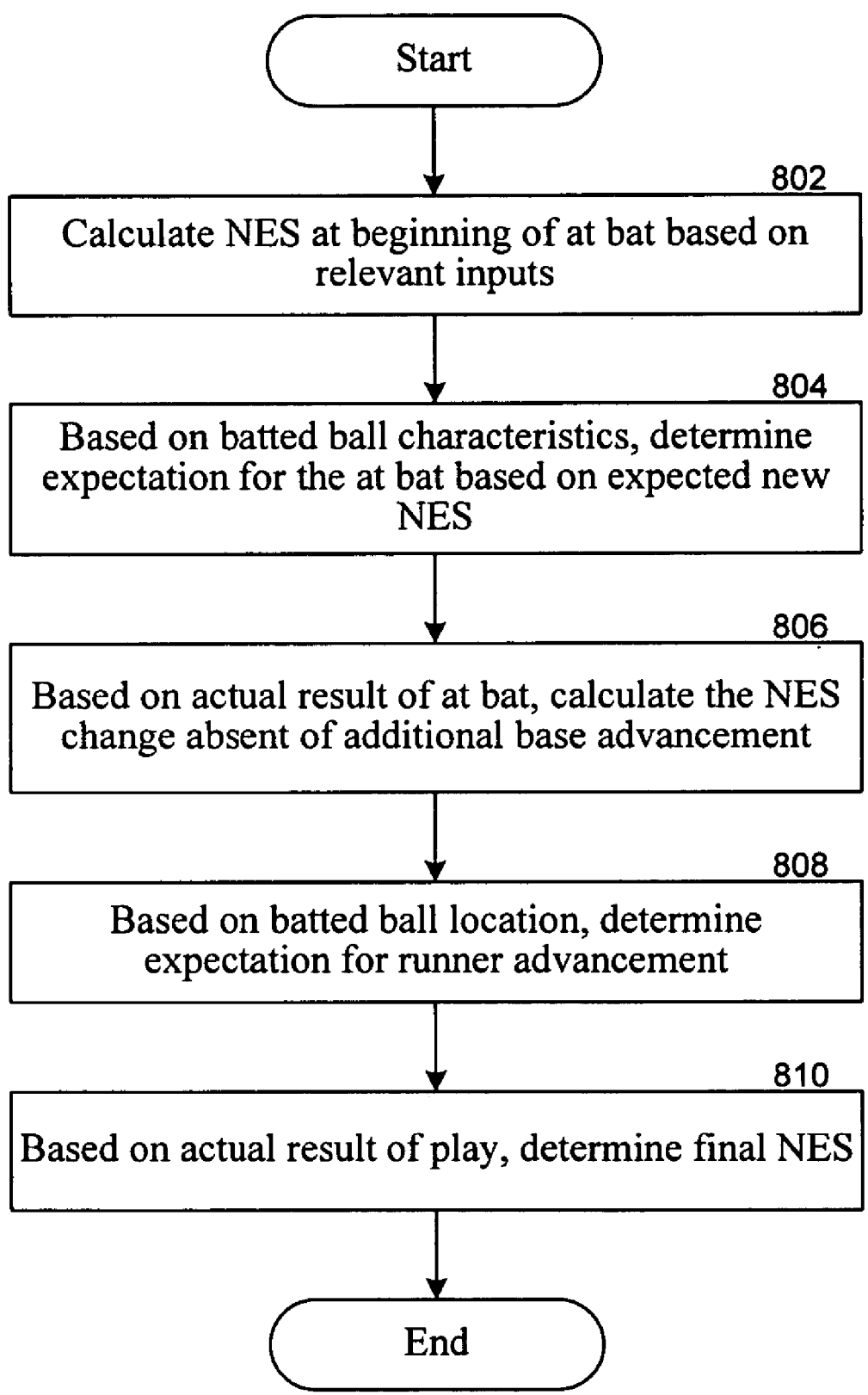
FIG. 8 is a flow diagram illustrating an example NES calculation and distribution amongst the athletes involved in the intermediate states of a baseball play.

FIG. 8 is a flow diagram illustrating an example NES calculation and distribution amongst the athletes involved in the intermediate states of a baseball play. In particular, the intermediate states break down the baseball play into four states which isolate hitting, pitching, base running, and defensive contributions of the athletes involved in the play. The number of states and the types of contributions are provided only as examples, and one skilled in the art will appreciate that a play may be broken down into a different number of states, including a single state, and the types of contributions may vary, for example, depending on the play and the sport.

In block 802, the sport server calculates a NES—i.e., a NES0— at the beginning of the at bat based on the relevant inputs (i.e., the game state before the play occurs) into the NES equation [1]. In block 804, using the batted ball characteristics, the sport server determines an expectation for the at bat based on an expected new NES—i.e., NES1. For example, the sport server determines from the tables the relative probabilities of a single, double, triple, or out occurring based on factors, such as hit distance, hit type, hit power, hit angle, etc. These probabilities are calculated empirically from observed data over a predetermined number of seasons. The sport server uses these probabilities to calculate an expected new NES (NES1) based on a hit of this type. At this stage, the sport server does not consider what actually happened on the play, but rather merely calculates an expected new NES based on a batted ball of this type. The sport server subtracts NES0 from NES1 to determine a change in NES caused by this hit. The sport server may divide this change in NES between the pitcher and hitter—i.e., the athletes involved in this intermediate state of the play—according to relevant percentages as determined from the analysis of past events.

In block 806, the sport server calculates a NES change based on the actual result of the at bat, absent of additional base advancement. For example, based on the outcome of the batted ball (i.e. single, double, triple or out) the sport server calculates a new NES—i.e., NES2. This NES change (i.e., NES2−NES1) does not take into account the actual new game state, but rather only the game state that would have been directly impacted by the result of the batted ball. For example, if a man is on first base and the batter hits a single, only the NES change associated with the player advancing to second base is captured in this calculation regardless of whether the runner actually advanced to second base. The sport server divides this change in NES between the fielder(s) involved and the hitter, in the hitter's role as a base runner, according to relevant percentages as determined from the analysis of past events. Depending on the type of play (e.g., base on balls, strike out, home run), this calculation may not be necessary.

In block 808, the sport server determines the expectation for base runner advancement based on the location of the batted ball. The sport server determines an expected base running outcome based on the outcome of the batted ball and the context of the game situation. For example, based on the hit characteristics and the result of the hit (e.g., a single to right, fly out to left, etc), the sport server calculates probabilities of advancement and an expected new NES—i.e., NES3. The sport server subtracts NES2 (calculated in block 806 above) from NES3 to determine a change in NES, and may divide this change in NES between the pitcher and hitter as a characteristic of the hit, for example, according to relevant percentages as determined from the analysis of past events.

In block 808, the sport server determines a final NES based on the actual result of the play. The sport server subtracts NES3 from the final NES to determine a change in NES, and may divide this change in NES between the hitter and the fielders involved in the play, for example, according to relevant percentages as determined from the analysis of past events.

By way of an example to illustrate the NES calculation and distribution example of FIG. 8, Player JD comes up to bat in the third inning of a game against the New York Yankees in Fenway Park. Player BM is on first base and there is one out. Using these factors, the NES value is 0.54 runs in this situation (NES0, block 802).

Assuming Player JD strikes out on the eighth pitch of the at bat, no advancement by Player BM is anticipated. A NES2 value of 0.29 runs is calculated based on there being two outs and a runner on first base. The change in NES is actually 0.25 runs (i.e., the difference between NES0 and NES1) and this amount of performance points may be split with, for example, 38% or 0.095 performance points being added to the pitcher, and 62% or 0.195 performance points being subtracted from Player JD. The percentage allocation is an example, and may be determined from an analysis of the historical data.

Assuming Player JD hits a hard line drive just off the right field line and the ball lands less than 150 feet from the infield, the data in the probabilistic tables may indicate that a hit ball of this type has: a 65% chance of being an out; a 12% chance of being a single; a 20% chance of being a double; and a 3% chance of being a triple. Using these probabilities, the expected new NES is calculated based on a 65% chance of there being a man on first base with two outs (e.g., expected new NES for this probable outcome=0.20), a 12% chance of men on first and second base with one out (0.10), a 20% chance of men on second and third base with one out (0.21), and a 3% chance of one run scored and a man on third base (0.06). Summing up all these probable percentages produces a new NES1 of 0.57 runs (NES1, block 804). The change in NES caused by this batted ball is then 0.57−0.54 or 0.03 runs. This amount of performance points may then be split between the pitcher and Player JD, with Player JD receiving positive performance points and the pitcher receiving negative performance points.

Continuing the example, Player JD's line drive may actually result in a double down the line. Based on a two base hit, the new NES2 is expected to be men on second and third base with one out, which is 1.07 runs (NES2, block 806). The difference between NES2 and NES1 is 1.07−0.57 or 0.5 runs. This amount of performance points may then be split between the fielder's in the play (e.g., the first baseman who had a chance to field the play and the right fielder who could have held Player JD to a single) and Player JD.

Continuing the example, based on a double hit to that area of the field, it may be determined that on average the base runner advances to third base 80% of the time (0.86) and scores 18% of the time (0.31) and is thrown out 2% of the time (0.01). The estimated NES3 caused by the expected base running advancement is 1.18 runs (NES3, block 808). The difference between NES3 and NES2 is 1.18−1.07 or 0.11 runs, and this amount of performance points may be split between Player JD and the pitcher.

Continuing the example, on the play, Player BM may actually score and Player JD may end up at second base. The final NES associated with a run in and a man on second base with one out is 1.64 runs (final NES, block 810). The difference between the final NES and NES3 is 1.64−1.18 or 0.46 runs, and this amount of performance points may be split between the base runner (i.e., Player JD) and the fielders involved with the play.

One skilled in the art will appreciate that similar NES calculations and distributions can be made amongst the athletes involved in the intermediate states of a play for other sports such as football, basketball, hockey, soccer, etc. For example, the intermediate states for football may break down a football play into states which isolate passing and pass defended, running and run defended, etc.

Market Value for Shares of Financial Instruments in Real-Life Athletes

Figure 9:
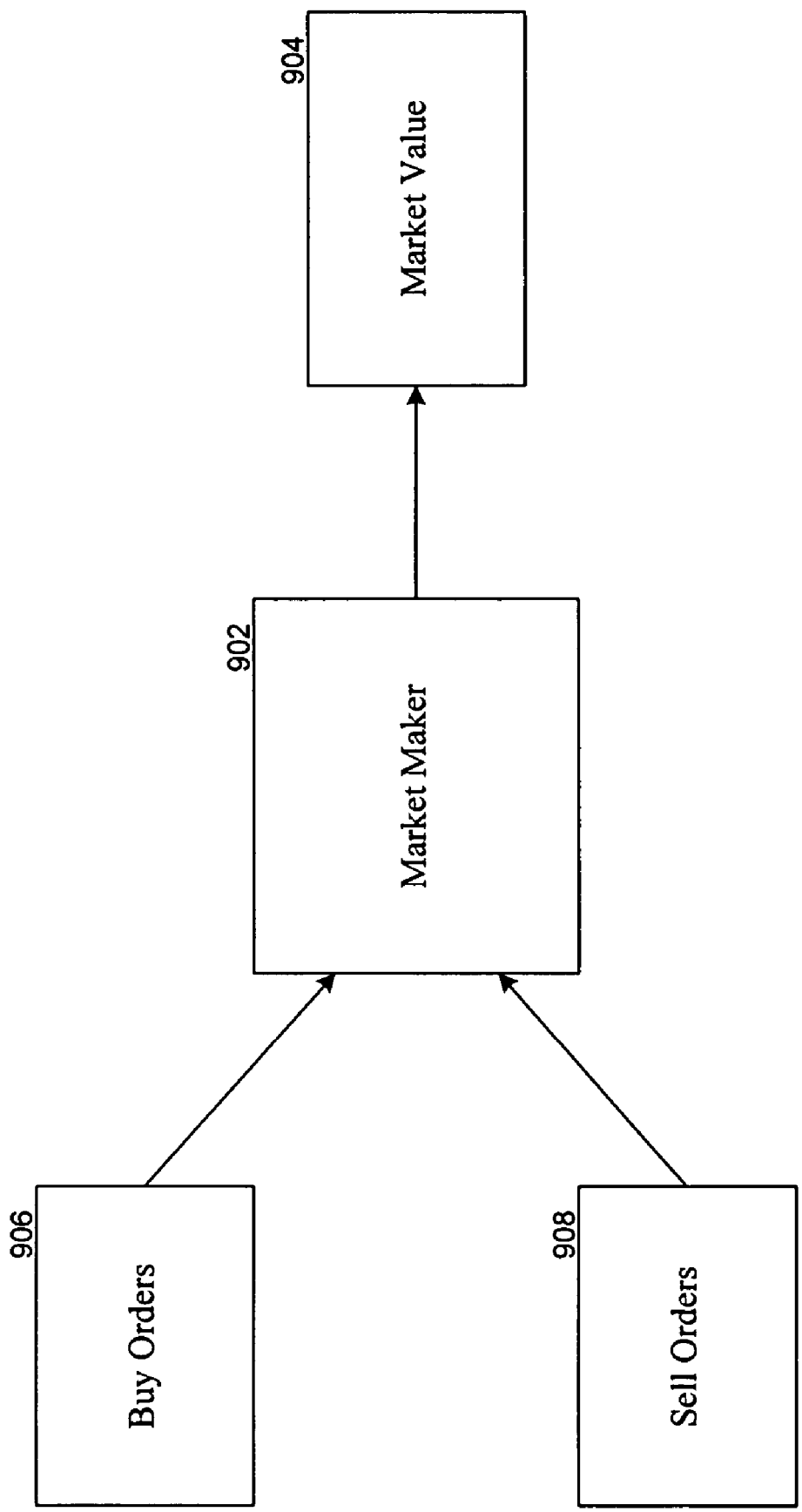
FIG. 9 is a block diagram illustrating the derivation of a market value for a share of an athlete, according to some embodiments.

FIG. 9 is a block diagram illustrating the derivation of a market value for a share of a financial instrument in an athlete, according to some embodiments. As depicted, a market maker 902 adjusts a market value 904 of each share of a financial instrument in a real-life athlete in response to buy orders 906 and sell orders 908 submitted by users of the valuation system, such as the participants of fantasy sports challenges. In some embodiments, the market exchange server component of the valuation system functions as the market maker by buying shares of financial instruments from users wanting to sell the shares of financial instruments, and selling shares of financial instruments to users wanting to purchase the shares of financial instruments. The market maker relies on the trade balance between buying and selling to adjust the price of the shares of the financial instruments.

In some embodiments, the market maker adjusts the market value of a share of a financial instrument in response to the buy orders and the sell orders as they arrive. In order to gauge the demand for a share of a financial instrument, the market maker relies on the trade balance, which represents the ratio of the total value of buy orders to the total value of sell orders over a period of time, and may be calculated as:

$$TradeBalance = \frac{\sum_{t=T}^{T-1} p_t * SharesBought}{\sum_{t=T}^{T-1} p_t * SharesSold} \quad [4]$$

In equation [4] above, $p_t$ is the market value at time t, l is the number of periods over which the trade balance is calculated, and T is the current period.

In some embodiments, the market maker attempts to keep the trade balance as close to one (1) as possible by adjusting the market value in response to changes in the trade balance. For example, if the trade balance is below one (i.e., the value of the sell orders is higher than the value of the buy orders over a set period of time) then the market maker reduces the market value, in order to attract more buy orders.

In some embodiments, the market maker adjusts the market value by following log normal distributions which approximate stock returns. In order to incorporate the log normal distribution into the stock adjustment process, the market maker may incorporate Brownian motion into the adjustment process. Brownian motion implies that at any given point, a stock price may move up or down according to:

$$p_{(t+1)} = \begin{cases} p_t u & \text{if price goes up} \\ p_t d & \text{if price goes down} \end{cases} \quad [5]$$

In which:

$$u = \frac{1}{2}(e^{-(\mu*dt)} + e^{(\mu+\sigma_2)dt}) + \{[\frac{1}{2}(e^{-(\mu*dt)} + e^{(\mu+\sigma_2)dt})]^2 - 1\}^{1/2}$$

and:

$$d = 1/u$$

In the equations above, $\mu$ is the riskfree rate of return, dt is the length of time between transactions, and $\sigma$ is the volatility of the stock.

In some embodiments, the market maker may modify the standard Brownian motion to better capture to magnitude of the difference between the buy and sell orders. For example, the Brownian motion may be modified by multiplying the gross upward price adjustment by the square root of the trade balance ratio, and multiplying the gross downward price adjustment by the reciprocal of the trade balance ratio as depicted in equation [8] below:

$$p_{(t+1)} = \begin{cases} p_t + (p_t u - p_t)\sqrt{TradeBalance} & \text{if price goes up} \\ p_t + (p_t d - p_t)1/\sqrt{TradeBalance} & \text{if price goes down} \end{cases} \quad [8]$$

In some embodiments, the market maker establishes an IPO price for a share of each financial instrument that is available for purchase by the users of the valuation system, such as the participants in the fantasy sports challenges or other users of the valuation system who request valuations for plays, athletes, and other services provided by the valuation system. For example, for each real-life athlete supported by the market maker, the market maker may use any of a variety of well-known statistical models to perform a historical analysis of the real-life performance of the athlete. An estimate of the performance points the athlete will generate over a predetermined period of time may be determined from the historical analysis of the real-life performance of the athlete. These estimates can incorporate the projected performance as well as the likelihood the athlete will still be in the professional leagues. The market maker may then choose a discount rate used for a discounted cash flow analysis. Using the estimated performance over the period of time, the market maker then calculates the total discounted performance flow by multiplying each future cash flow by a yearly discount factor which is calculated from the discount rate.

In some embodiments, the market maker establishes a floor price for each share of a financial instrument. The floor price is a minimum amount that will be charged for a share of a financial instrument. For example, the market maker may establish a floor price, such as $10.00 or 10 fantasy money units. By setting a floor or minimum price, the market maker minimizes the phenomenon of a drastic price increase which may be caused by purchases of shares of a financial instrument that are drastically undervalued.

Athlete Valuation

Figure 10:
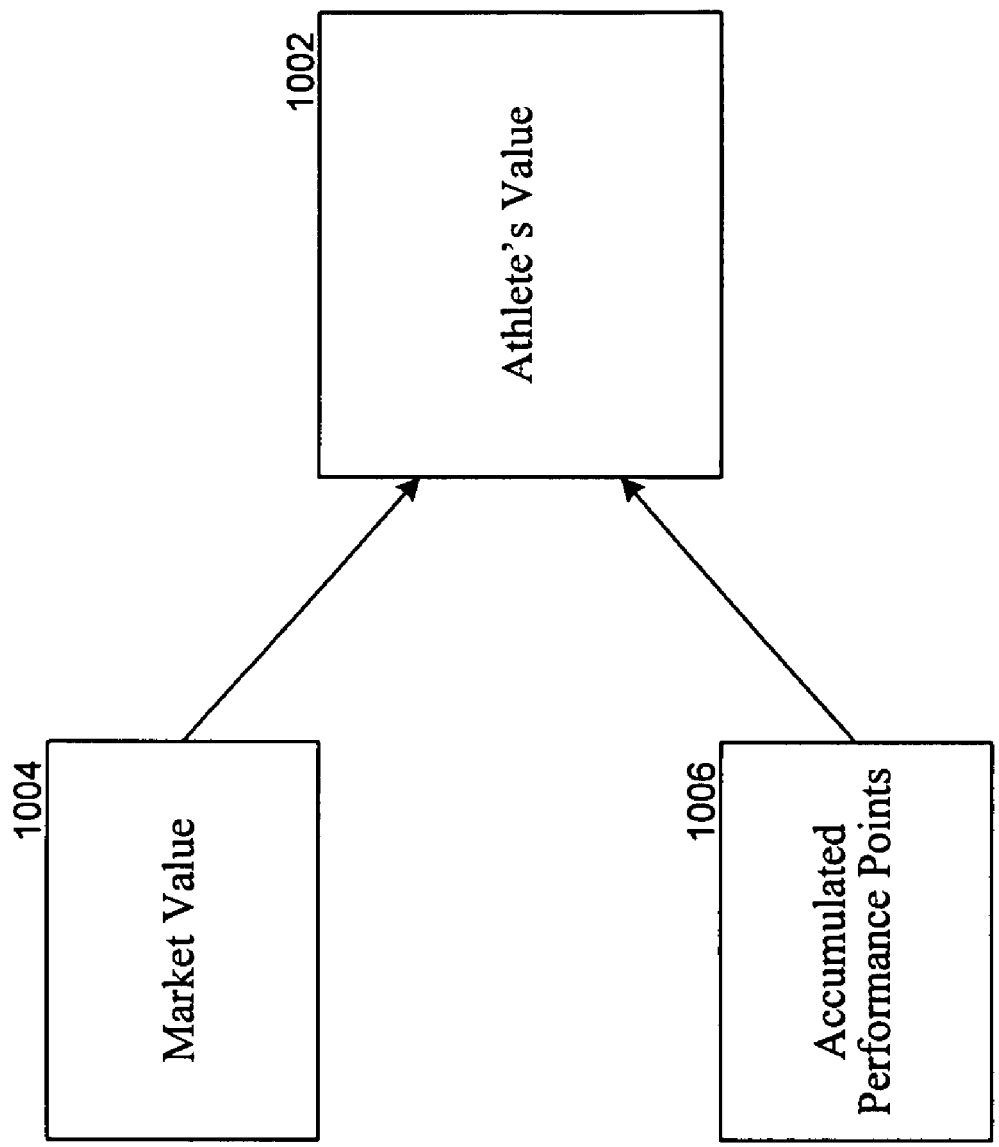
FIG. 10 is a block diagram illustrating the derivation of a value of an athlete, according to some embodiments.

FIG. 10 is a block diagram illustrating the derivation of a value of an athlete, according to some embodiments. As depicted, an athlete's value 1002 is derived from a combination of the athlete's market value 1004 and the athlete's accumulated performance points 1006. At any instance in time, a value of an athlete in the valuation system is the combination of the price of a share of the financial instrument in the athlete and the performance points generated by the athlete. As discussed above, the valuation system provides a market where its users are allowed to spend fantasy money units to purchase shares of financial instruments. In some embodiments, the valuation system allows the values of the shares of financial instruments to fluctuate based on the buy-sell pressure. The valuation system models an electronic market maker, which sits at the end of each transaction, adjusting the price of the shares of financial instruments to create a constant trade balance between buying and selling. For example, the valuation system may attempt to achieve an equal trade balance (e.g., measured by shares bought*price/shares sold*price) by adjusting price accordingly.

Athletes generate performance points based on their on-field performance as measured by the valuation system using the play valuation techniques and the techniques for distributing the value of the play amongst the athletes as discussed above. In some embodiments, performance points are accrued each time an athlete has a measurable impact on the game. In general, performance points are a comparison of the athlete's performance in a given situation versus the baseline average in that situation. This methodology assigns a point value to each performance.

Win Probability

In some embodiments, the valuation system determines a probability that a player or team is going to win a particular game. The valuation system may then provide the win probability to various media outlets for display or broadcast, for example, within the context of the game. The valuation system may also display or broadcast the win probability through its own broadcast source, such as its web site.

In some embodiments, the probability that a team is going to win a particular game is dependent upon factors such as the score of the game as well as several variables that are particular to each sport. For example, in football, the probability that a team is going to win may be dependent upon variables such as, the points they have scored, the points they have allowed, whether they have possession of the ball, time remaining, down and distance, etc. These game state variables are particular to each sport, but the style of analysis to determine the win probability for sports other than football is similar. Some of the game state variables are related to the skill of the teams on the field (e.g., yards allowed) and some are not (e.g., score and time remaining). The win probability can be calculated on a team specific or team independent basis.

Prior to any game, the odds that one team is going to win is rarely even. The actually probability of winning may be estimated based upon known variables such as the winning percentage for each team prior to the game, which team is at home, which team has scored more points in the season, which team has allowed more points, etc. These variables may be thought of as season state variables. These calculations are performed on a team specific basis, as the team independent win probability, prior to the start of a game, is equal for all teams or tournament participants.

The same type of analysis may be used to calculate the probability that a team is going to win a series of games. For example, in baseball, the World Series is a best of seven series. Each strikeout and each homerun affect not only the probability that a team will win a given game, but also the probability that they will win the entire series.

In some embodiments, the statistical analysis may be performed using binary regression techniques in which a win is coded as a "1" and a loss is coded as a "0." The independent variables are the game and season state variables. For team independent analysis, only the non team specific independent variables may be used. Play by play data for the game state variables may create a large data set for the in game estimates. Sports with longer seasons may allow for larger data sets for the pre game estimates, but using data from previous seasons and adjusting for offseason changes allows for pre game estimates in sports such as football that have a short season and, thus, more volatile estimates of the season state variables.

For example, for football, game state variables may include score, quarter, time remaining, team with possession, down, distance to go, passing yards, rushing yards, and valuation system statistics. Of these, passing yards, rushing yards and valuation system statistics are team specific variables. Season variables may include winning percentage, rushing yards, passing yards, valuation system statistics, coaching variables (e.g., years coached, lifetime win percentage, etc.), injuries, and home team. During playoff time, the analysis may be extended to include the probability that the team is going to win the championship (e.g., Super Bowl) based on their probability of winning the playoff game and the potential opponents. This analysis may include a mix of game and season state variables.

For example, for baseball, the game state variables may include score, team at bat, runners on base, lineup position, inning, pitch count, pitcher (e.g., specific pitcher, starter vs. reliever, etc.), home team, league, and valuation system statistics. The season variables may include winning percentage, valuation system statistics, injuries, expected starting pitchers, and home team. In the playoffs, a combination of game state and season state variables may be used to calculate the probability a team is going to win the current series and/or the World Series.

For example, for basketball, the game state variables may include score, quarter, time remaining, fouls, and valuation system statistics. The season variables may include winning percentage, home team, injuries, coaching variables, consecutive games, and road trip. In the playoffs, a combination of game state and season state variables may be used to calculate the probability a team is going to win the current series and/or the championship (e.g., NBA Championship).

For example, for golf, the tournament state variables may include score, strokes behind, number of golfers ahead, hole, par on current hole, day of the tournament, and golfers remaining to play. The pre-tournament state variables may include total winnings, winning of the rest of the field, yardage of the course, and average score. In match play tournaments, tournament and pre-tournament variables may be used to estimate the probability of winning the entire tournament.

For example, for tennis, the match state variables may include game score, set score, serve, faults, and serve velocity. The pre-match state variables may include ranking, opponent's ranking, major tournament, and head-to-head matchup history. Match state and pre-match state variables, along with related data on potential opponents, may be used to calculate the probability of winning the entire tournament.

Fantasy Sports Challenge

An illustrative example of a fantasy sports challenge in accordance with the techniques described herein is now described. In some embodiments, the fantasy game server component of the valuation system hosts the fantasy sports challenges. A user interested in creating and/or participating in a fantasy sports challenge may execute a browser program on the user's client system, and visit a fantasy sports challenge web site provided by the web server component of the valuation system by, for example, entering a URL for the web site. In response, if the user is not a registered user, the web site may present a registration web page with which the user can register with the valuation system. If the user is a registered user, the web site may present a home page of the fantasy game server through which the user can access various features of the valuation system, including the fantasy sports challenges.

In some embodiments, the home page may display a list or menu of links which provide access to the various features of the valuation system. For example, one of the provided links may present a web page through which a registered user can act as a challenge creator and create a custom fantasy sports challenge. Other links may present web pages that: display a list of links associated with hosted fantasy sports challenges; allow a registered user to join a fantasy sports challenge; allow a participant of a fantasy sports challenge to buy and/or sell shares of financial instruments; allow a participant of a fantasy sports challenge to check the status of his or her portfolio; allow a registered user to search for athletes based on one or more user-specified criteria; allow a registered user to search for financial instruments based on one or more user-specified criteria; allow a registered user to track athlete values; allow a registered user to compare athlete values; allow a registered user to view a list of fantasy sports challenges the user is participating in; allow a registered user to search the hosted fantasy sports challenges based on one or more user-specified criteria; allow a registered user to track one or more games and the values of the plays as they occur in the games in real-time; and perform other actions provided by the valuation system.

In some embodiments, the fantasy game server may impose a minimum or default set of rules for all fantasy sports challenges that are hosted by the fantasy game server. These default set of rules may specify the criteria, such as, by way of example, joining a challenge, entry fee, starting balance, required holdings in a participant's portfolio, athlete restrictions; portfolio allocation, challenge start time, buying and selling shares of financial instruments, challenge end time, judging, etc., used to conduct the fantasy sports challenge.

For example, the rules for joining a challenge may require all fantasy sports challenges to have a minimum number of participants or traders, such as, by way of example, two (2), three (3), etc. A challenge that does not obtain the minimum number of participants will be cancelled, and the entrants will be refunded their entry fees. The challenge creator may be assessed a fee for custom challenges that do not draw enough interest to meet customized requirements for the minimum number of participants.

The fantasy game server may or may not require a payment of an entry fee to participate in a fantasy sports challenge. For example, a challenge creator for a custom fantasy sports challenge, or a fantasy sports challenge administrator for fantasy sports challenges sponsored by the fantasy game server, may specify an entry fee in order to participate in a challenge. In some embodiments, the fantasy game server may charge a service fee for hosting a custom fantasy sports challenge.

The starting balance is an amount of fantasy money units with which each participant in a challenge starts. For challenges that require a payment of an entry fee, the fantasy game server may convert the entry fee or a portion of the entry fee into fantasy money units for each participant. Each participant in a particular fantasy sports challenge may receive the same amount of fantasy money units to buy and sell financial instruments, or they may receive different amounts of fantasy money units to acquire and divest financial instruments depending upon a number of factors. Such factors may include the amount of money that the participant paid as an entry fee to enter the fantasy sports challenge, the position of the participant with respect to which participant entered the fantasy sports challenge first, second, and etc., or a random assignment of value.

The required holding in a participant's portfolio may specify a minimum number of different athletes that are required in each portfolio at any instance in time during the course of a challenge. The required holdings may also specify a maximum number of different athletes that may be contained in a portfolio at one time. For example, the fantasy game server may require all portfolios to maintain a minimum of 3 different athletes, and a maximum of 15 different athletes at any instance time during the course of the challenge.

Athlete restrictions specify the types of athletes that may be purchased and held in a portfolio. For example, a fantasy sports challenge may require participants to only have shares of financial instruments in pitchers and catchers, or other positions and combinations of positions, in their portfolios. An athlete's position is the position designation as indicated by the statistics and/or game feed providers. In another example, a fantasy sports challenge may require participants to purchase shares of financial instruments in a specified list of athletes. In still another example, a fantasy sports challenge may require participants to have shares of financial instruments in athletes from two or more different sports. The athlete restrictions may specify a combination of one or more of the following: one or more athlete positions depending on the particular sport, including positions from different sports; one or more athletes from a list of athletes; a number or minimum number of sports to be included in a portfolio; a maximum number of sports to be included in a portfolio; league or leagues; division or divisions; conference or conferences; alma mater; affiliation with a particular sponsor or sponsors; etc.

Portfolio allocation specifies a minimum percentage of a portfolio that may be allocated to each athlete (or a financial instrument comprising the athlete) and a maximum percentage of the portfolio that may be allocated to any one athlete (or a financial instrument comprising any one athlete). For example, challenge participants may be required to allocate at least 5% of their fantasy money budget for shares of financial instruments in each athlete contained in their portfolios, and a maximum allocation of 90% of their fantasy money budget for shares of financial instruments in any one athlete contained in their portfolios. In some embodiments, challenge participants are not actually purchasing shares of their financial instruments when they initially set or specify their allocations. By initially setting their allocations, for example, prior to the start of a challenge, they are setting aside a percentage of their starting balance of fantasy money units to purchase the shares of financial instruments in the athlete or athletes at the market value as of the start time of the challenge. During the course of the challenge, buying and selling shares of financial instruments is processed as soon as practicable after the order is submitted and received.

Challenge start time specifies a start time for a fantasy sports challenge. The fantasy game server executes the pending purchase orders as specified by all of the challenge participants' initial portfolio allocation when the challenge starts. In some embodiments, the fantasy game server does not execute the buy orders for shares of financial instruments in any particular order. Because the market for the purchase and sale of shares of financial instruments is always moving, purchase prices may not exactly match for each participant in a challenge. In some embodiments, if price changes for a share of a financial instrument are so dramatic that a specified allocation of a portfolio cannot purchase any shares of the financial instrument, the fantasy game server may notify the participant that specified the portfolio allocation. In some embodiments, a minimum unit of purchase may be set to at least one whole share of a financial instrument.

Buying and selling shares of financial instruments specify the procedures for buying/selling shares. In some embodiments, the fantasy game server provides a web page through which participants in a challenge can submit buy and sell orders for shares of financial instruments. For example, to submit a buy order for shares of a financial instrument, a participant in a challenge may be required to indicate or specify the challenge, the desired athlete, the maximum purchase price, the number of shares, etc., on the web page. The fantasy game server may then execute the trade—i.e., buy order. In some embodiments, if a current price of a share of the specified financial instrument is below the specified maximum purchase price, the fantasy game server executes the trade at the lower price. To submit a sell order for shares of a financial instrument, the participant may be required to indicate or specify the challenge, the desired athlete, the minimum sell price, the number of shares, etc., on the web page. The fantasy game server may then execute the trade—i.e., sell order. In some embodiments, if a current price of a share of the specified financial instrument is above the specified minimum sell price, the fantasy game server executes the trade at the higher price. Upon executing the trade, the fantasy game server provides information such as the execution price, the number of shares purchased/sold, and the new price for a share of the financial instrument.

In some embodiments, the participant may submit an order to purchase or sell shares of a financial instrument at the current market value by specifying the athlete and a percentage of the participant's portfolio. For example, for a buy order, the specified percentage of the portfolio may be converted to fantasy money units, which is then used to buy shares of the specified financial instrument. In a similar manner, the participant may also sell shares of a financial instrument currently in the portfolio. Because the market values of shares of financial instruments may be moving, there is no guarantee that a set number of shares will be obtained. In some embodiments, when a participant conducts trades by adjusting the percentage of shares of more than one financial instrument in the portfolio, the fantasy game server executes the sells before executing the buys to free up fantasy money units to use for the additional purchases—i.e., the buy orders.

Challenge end time indicates an end time for the fantasy sports challenge. The fantasy game server does not permit trades to be conducted after the challenge end time. Price fluctuations after a challenge end time do not affect the value of the portfolios that are participating in the challenge.

Judging specifies the criteria used to determine a winner of a fantasy sports challenge. In some embodiments, the fantasy game server determines a winner of a challenge by ranking the participants in the challenge according to the returns generated by their portfolios. The return is calculated as the net increase in the value of the portfolio (i.e., the difference of the market value of the shares of financial instruments contained in the portfolio and any "unspent" fantasy money units at the end of the challenge compared to the initial allocation of fantasy money units at the beginning of the challenge), and the total dividends (i.e., performance points) earned by the shares of financial instruments while in the portfolio. The dividends include the dividends generated by the shares of financial instruments that were contained in the portfolio at any time during the course of the challenge (i.e., shares of financial instruments that may have been bought and sold during the course of the challenge). Therefore, net increase takes into consideration not only the shares of financial instruments held in the portfolio at the end of the challenge, but also the shares of financial instruments that were held and sold during the course of the challenge. The fantasy game server distributes prizes to the participants based on the specified rules of the challenge.

A challenge creator may specify values and/or requirements for the some or all of the aforementioned fantasy sports challenge criteria. For example, a challenge creator of a custom fantasy sports challenge may specify a different number of participants for the challenge to be a valid challenge. In some embodiments, if a criterion is not specified for a fantasy sports challenge, the fantasy game server may provide a default for the criterion. The challenge creator may also specify one or more criteria that is different from or in addition to those listed above, such as, a limit on the number of trades, prize or prizes for the winner of the challenge, times when trades are not permitted, maximum number of shares of a financial instrument permitted in a portfolio, maximum number of shares of a financial instrument in the challenge, etc. The aforementioned criteria are provided only as examples and not as a limitation, and it will be appreciated that a fantasy sports challenge may be conducted without one or more of the aforementioned criteria and/or with one or more different criteria than those mentioned above.

Figure 11:
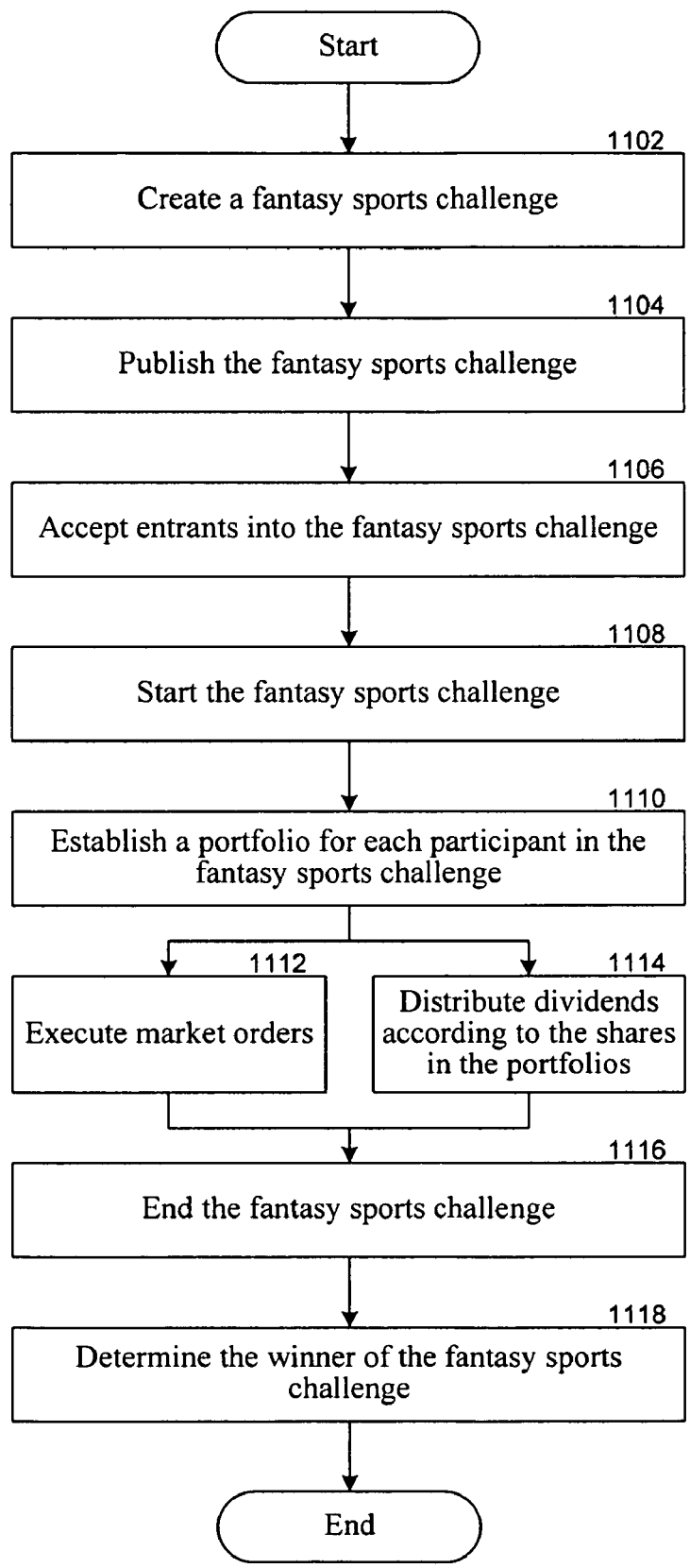
FIG. 11 is a flow diagram illustrating the processing of the fantasy game server in conducting a fantasy sports challenge, according to some embodiments.

FIG. 11 is a flow diagram illustrating the processing of the fantasy game server in conducting a fantasy sports challenge, according to some embodiments. In block 1102, the fantasy game server creates a fantasy sports challenge. For example, the fantasy sports challenge may be created by a registered user acting as a challenge creator or may be created by the fantasy game server, such as a fantasy game administrator. In block 1104, the fantasy game server publishes the fantasy sports challenge. For example, the fantasy sports challenge may be "advertised" on a web page or multiple web pages hosted by the valuation system or some other suitable server or web server.

In block 1106, the fantasy game server accepts entrants into the fantasy sports challenge. The entrants participate in the fantasy sports challenge. In some embodiments, the entrants are registered users of the valuation system or the fantasy game server. In block 1108, the fantasy game server starts the fantasy sports challenge, for example, at its designated start time. In block 1110, the fantasy game server establishes a portfolio for each participant in the fantasy sports challenge. For example, each participant is initially allocated an equal amount of fantasy money units with which the participant can establish his or her portfolio. In some embodiments, a participant may establish his or her initial portfolio by purchasing shares of financial instruments.

In some embodiments, a participant may establish his or her initial portfolio by drafting athletes into his or her initial portfolio in competition with the other participants of each individual challenge. For example, a draft may follow a "snaking" pattern. This means that the participant with the first pick in the first round will pick last in the second round and then first again in the third round. The participant with the last pick in the first round will pick first in the second round and then last again in the third round. In other words, the draft order is reversed every other round. In some embodiments, the draft order may be drawn at random or assigned based upon the amount of the entry fee paid to join the challenge. Participants may be required to pay for the shares of financial instruments that they drafted by using their fantasy money units. In some embodiments, participants are not required to pay for the athletes that they drafted into their initial portfolio.

In some embodiments, a participant may establish his or her initial portfolio by playing a skill-based or chance-based game, the outcome of which determines the athletes that comprise each participant's initial portfolio. In some embodiments, a participant's initial portfolio may be assigned at random or by a challenge sponsor, leader or commissioner of the challenge, etc.

The fantasy game server performs blocks 1112 and 1114 during the course of the fantasy sports challenge, up to the time the fantasy sports challenge ends. Stated differently, the fantasy game server conducts the operations in blocks 1112 and 1114 for the duration of the fantasy sports challenge. In bock 1112, the fantasy game server executes market orders for the purchase and sale of shares of financial instruments. For example, each participant may spend all or a portion of the initially allocated fantasy money units to buy a share or multiple shares of a financial instrument or financial instruments to create his or her portfolio. Subsequently, at any time during the course of the challenge, each participant can alter the contents in his or her portfolio by submitting orders to buy and/or sell shares of financial instruments. The fantasy game server executes these orders as market orders for the purchase/sale of shares of financial instruments.

In block 1114, the fantasy game server distributes dividends according to the shares contained in the portfolios. For example, a portfolio might contain one or more shares of a financial instrument in a particular athlete. If a game involving the athlete occurs during the course of the challenge, the fantasy game server distributes any performance points generated by the athlete as dividends to the portfolio according to the actual number of shares of the financial instrument in the athlete and which is contained in the portfolio at the time the performance points were obtained. More specifically, the fantasy game server distributes the dividends to the participant that owns the portfolio, for example, into the participant's challenge account. If multiple participants own a share or multiple shares of the financial instrument, the fantasy game server distributes the dividends to each of the participants according to the number of shares of the financial instrument owned by each of the participants. In a similar manner, the fantasy game server distributes dividends generated by the other athletes during the course of the challenge.

In block 1116, the fantasy game server ends the fantasy sports challenge, for example, at its designated end time. For example, at the time the challenge was created, the creator of the challenge may have specified that the challenge is to last for a specific duration of time or that the challenge is to end at a specified point in time. In block 1118, the fantasy game server determines the winner of the fantasy sports challenge. For example, the winner of the challenge may be determined from a comparison of the combination of the dividends received by each participant during the course of the challenge and the net increase in each participant's portfolio value (i.e., the difference between the ending value of the portfolio and the initial allocation of fantasy money units).

Single Sport Challenge

Figure 12:
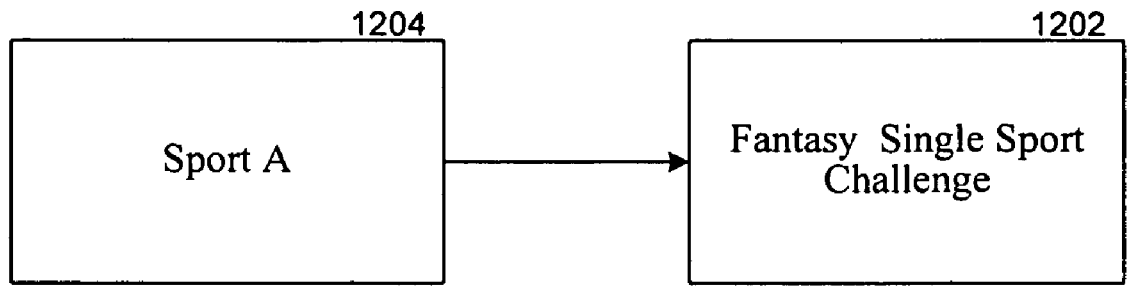
FIG. 12 is a high-level block diagram illustrating a single sport fantasy sports challenge.

FIG. 12 is a high-level block diagram illustrating a fantasy single sports challenge. As depicted, a fantasy single sport challenge 1202 only involves athletes from a single sport, for example, a Sport A 1204. In a fantasy single sport challenge, shares of financial instruments in athletes of a single sport are eligible to be held in the portfolios of the participants participating in the challenge. For example, in a fantasy baseball challenge, each participant may be permitted to hold shares of financial instruments in real-life baseball players in his or her portfolio. Conversely, in a fantasy football challenge, each participant may be permitted to hold shares financial instruments in real-life football players in his or her portfolio. The designated sport is specified by the creator of the challenge. During the course of the single sport challenge (i.e., the challenge "season"), participants are permitted to buy/sell shares of financial instruments in athletes in the designated sport. The price of the shares of financial instruments change due to buy-sell pressure generated as a result of the market orders placed by the participants in the challenge. "News" regarding an athlete, such as, by way of example, "bad press" or "good press," may directly impact the buy-sell pressure for shares of financial instruments in the athlete. Additionally, the expectation of the athlete's on-field performance during a game or games may indirectly impact the buy-sell pressure for shares of financial instruments in the athlete. It will be appreciated that one or more real-life athletes in a sport may not be available for purchase by the participants of a single sport challenge involving the particular sport. For example, the valuation system may not support every athlete in the particular sport.

In some embodiments, the creator of the single sport challenge may specify restrictions regarding the athletes that may be held by the participants in their portfolios. For example, the challenge creator may indicate that a fantasy baseball challenge is to involve only outfielders, infielders, catchers, pitchers, various other positions, or any combination thereof. Likewise, a fantasy football challenge may involve only quarterbacks, running backs, wide receivers, various other positions, or any combination thereof. In still another example, the challenge creator may indicate that a fantasy single sport challenge is to involve shares of financial instruments in an athlete or athletes from a list of one or more athletes, and specify the athletes that may be included in the financial instruments. Participants in such a challenge are then required to only hold shares of financial instruments in the specified athletes in their portfolios.

Cross-Snort Challenge

Figure 13:
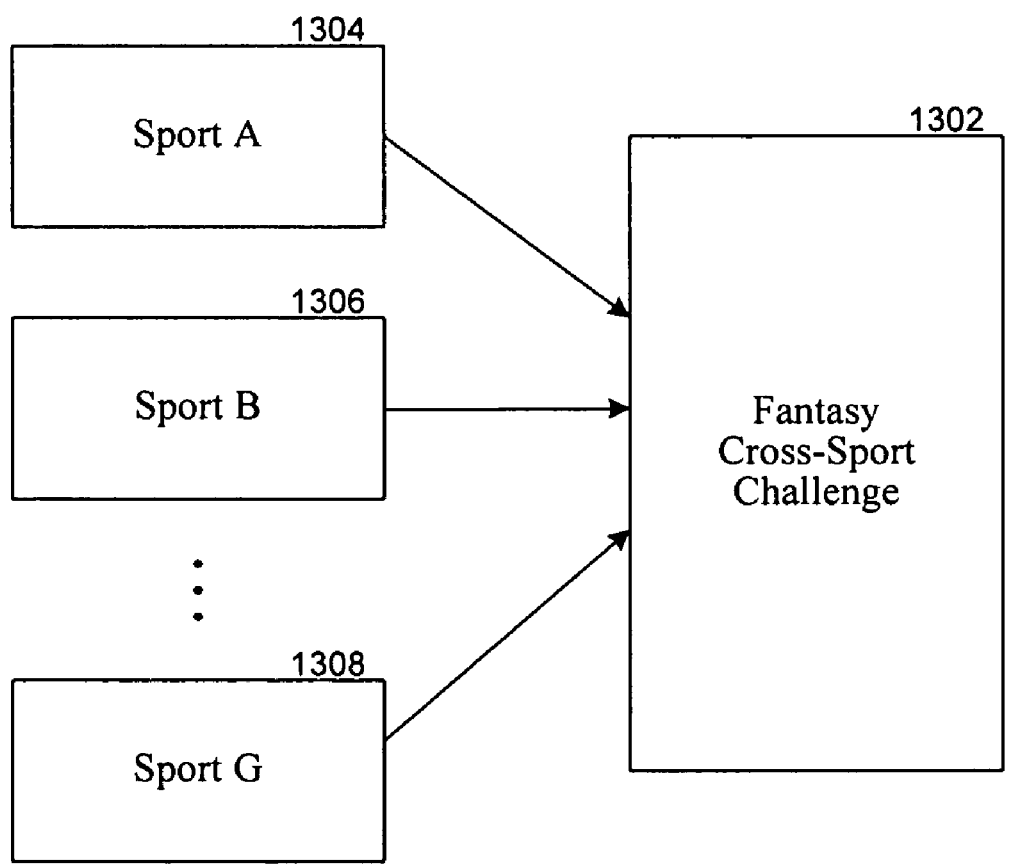
FIG. 13 is a high-level block diagram illustrating a cross-sport fantasy sports challenge.

FIG. 13 is a high-level block diagram illustrating a cross-sport fantasy sports challenge. As depicted, a fantasy cross-sport challenge 1302 involves athletes from a plurality of sports, such as Sport A 1304, Sport B 1306, and Sport G 1308. The number of sports depicted is for illustration only and not intended to suggest any limitation as to the number of sports that may be involved in the fantasy cross-sport challenge. As such, one skilled in the art will appreciate that the fantasy cross-sport challenge may involve athletes from two or more different sports.

In a fantasy cross-sport challenge, shares of financial instruments in athletes of the specified sports are eligible to be held in the portfolios of the participants participating in the challenge. For example, in a fantasy baseball-football challenge, each participant may be permitted to hold shares of financial instruments in real-life baseball players or football players in his or her portfolio. Conversely, in a fantasy basketball-soccer challenge, each participant may be permitted to hold shares of financial instruments in real-life basketball players or soccer players in his or her portfolio. During the course of the cross-sport challenge season, participants are permitted to buy/sell shares of financial instruments in athletes in the designated sports.

In a cross-sport challenge, one or more sports in the cross-sport challenge may be in an "off-season." During a sport's off-season, there are no games occurring in that sport. Accordingly, athletes in these sports are not participating in any games during the off-season and, thus, not generating any dividends. Thus, for any sport, during the off-season, the price of the shares of financial instruments in athletes in that sport changes due to buy-sell pressure that may result from news regarding the athletes. At issue may be the potential impact of such news on an athlete's ability to earn dividends the next season. For example, news that an athlete suffered a career-threatening injury may cause the participants in the challenge to sell the shares of financial instruments in the athlete. Conversely, news that an athlete has won a competition for a starting position on the athlete's team may cause participants in the challenge to buy shares of financial instruments in the athlete. This buying and selling, managed by the market maker mechanism, causes the fluctuation in the price of the shares of financial instruments during the off-season.

In some embodiments, the creator of the cross-sport challenge may specify restrictions regarding the athletes that may be held by the participants in their portfolios. For example, the challenge creator may indicate that a fantasy baseball-football challenge is to involve only baseball pitchers and outfielders and football quarterbacks and running backs. Participants in such a challenge are then required to only hold shares of financial instruments in the specified athletes in their portfolios.

Graphical User Interface (GUI)

Figure 14:
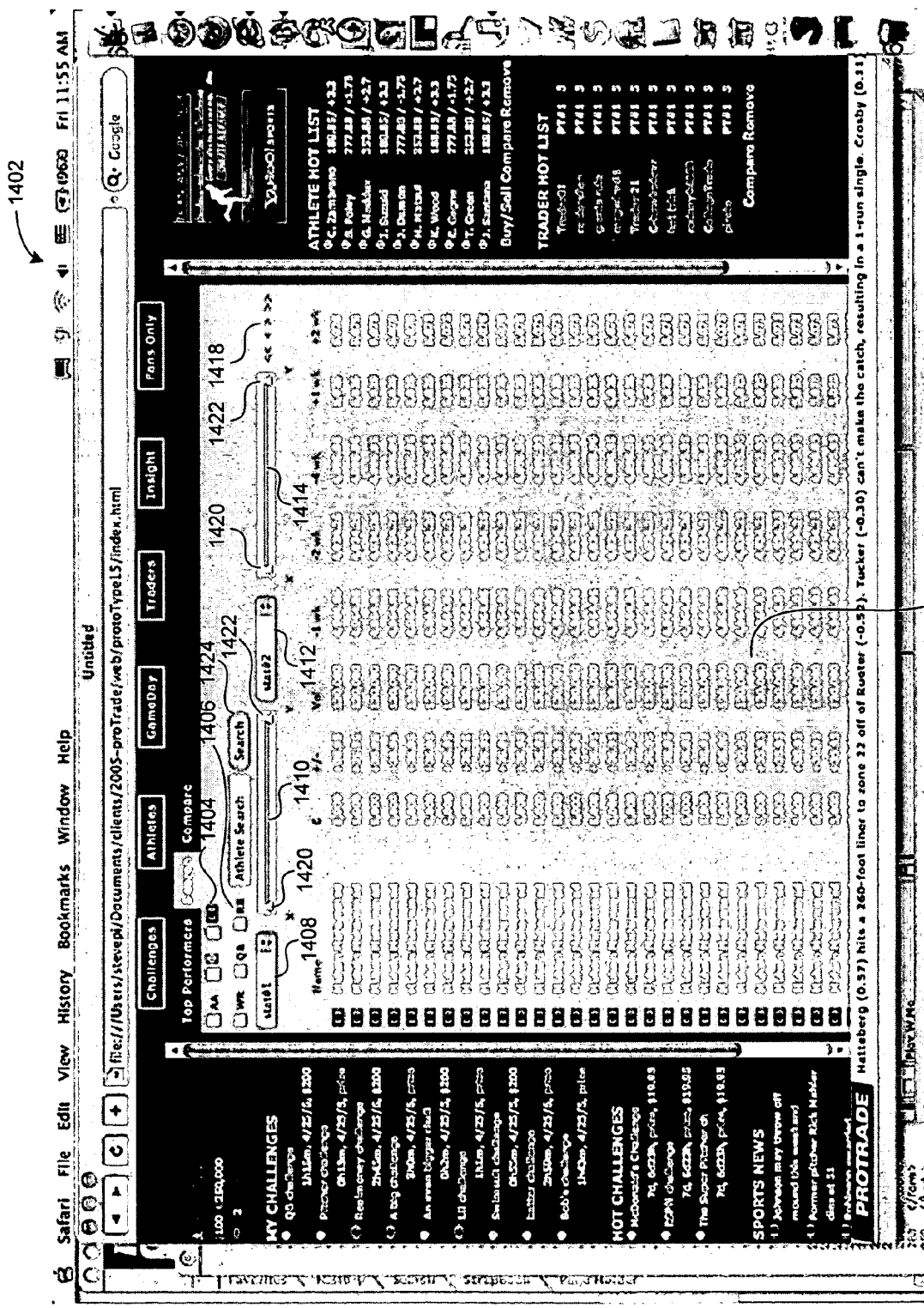
FIG. 14 is a display diagram showing a sample GUI through which a user can search for athletes in the valuation system.

FIG. 14 is a display diagram showing a sample GUI through which a user can search for athletes in the valuation system. As depicted, GUI 1402 shows sport selection boxes 1404, athlete position selection boxes 1406, a drop down menu 1408 and its associated slider 1410, a drop down menu 1412 and its associated slider 1414, and a display area 1416. Only two sets of drop down menus and sliders are shown in FIG. 14 for simplicity, and one skilled in the art will appreciate that there may be a different number of sets of drop down menus and sliders, which are accessible on the GUI by using, for example, positional arrows 1418.

The sport selection boxes allow a user to select a desired sport within which to perform the search of athletes. The athlete position selection boxes allow the user to select zero, one or more positions to search within. In some embodiments, the positions displayed by the athlete position selection boxes are dependent on the sport selected by the user using the sport selection boxes.

The drop down menus allow the user to select search criteria to use in searching the valuation system for athletes that meet the specified search criteria. For example, clicking on a drop down menu may display a list of searchable criteria such as, by way of example, athlete statistics based on the athlete's sport (e.g., home runs, runs batted in, bases on balls, strike outs, touchdowns, first downs, yards rushing, yards receiving, yards passing, fumbles lost, interceptions thrown, points scored, free throw percentage, field goal percentage, etc.), and market statistics (e.g., price for a share of a financial instrument, dividends generated, etc.). In some embodiments, the searchable criteria displayed in the drop down menu may depend on the sport selected by the user using the sport selection boxes. The displayed searchable criteria may also depend on the athlete positions selected by the user using the athlete position selection boxes. For example, assuming that the user specified baseball using the sport selection boxes and selected pitcher using the athlete position selection boxes, the drop down menus may display a list of statistics for baseball pitchers and a list of market criteria.

Each slider displays a range of values for the criteria selected in its corresponding drop down menu. The value at one end of the range is indicated at one end of the slider (e.g., as represented by the character "x" below each slider in FIG. 14) and the value at the other end of the range is indicated at the opposite end of the slider (e.g., as represented by the character "y" below each slider in FIG. 14). The range of values represented by each slider dynamically changes depending on the criteria selected in its corresponding drop down menu. Each slider allows the user to specify a range of values to use in searching the valuation system for athletes that meet the specified range of values for the particular criteria. For example, the user may slide a left indicator 1420 in the slider to specify a low value for the range, and slide a right indicator 1422 in the slider to specify a high value for the range. The values displayed below the slider (e.g., as represented by the character "x" and "y") may change depending on the position of the left and right indicators in the slider. Using the sets of drop down menus and sliders, the user may specify one or more search criteria. If the user needs to specify more than, for example, two search criteria, the user can use the positional arrows to display and access the sets of drop down menus and sliders as desired.

Once the desired search criteria are specified, the user can request the search by clicking on a search button 1424. In response, the valuation system performs a search of the athletes that meet the union of the search criteria specified by the user, and display the athletes in the display area. The user can then view the list of athletes that meet the specified search criteria.

In some embodiments, the valuation system or a component of the valuation system, such as the fantasy game server, may provide a GUI similar to GUI 1402 to allow a user to search for financial instruments. For example, the GUI may provide a drop down menu or menus and associated slides with which the user can select/specify financial instrument search criteria and values for the selected search criteria.

Figure 15:
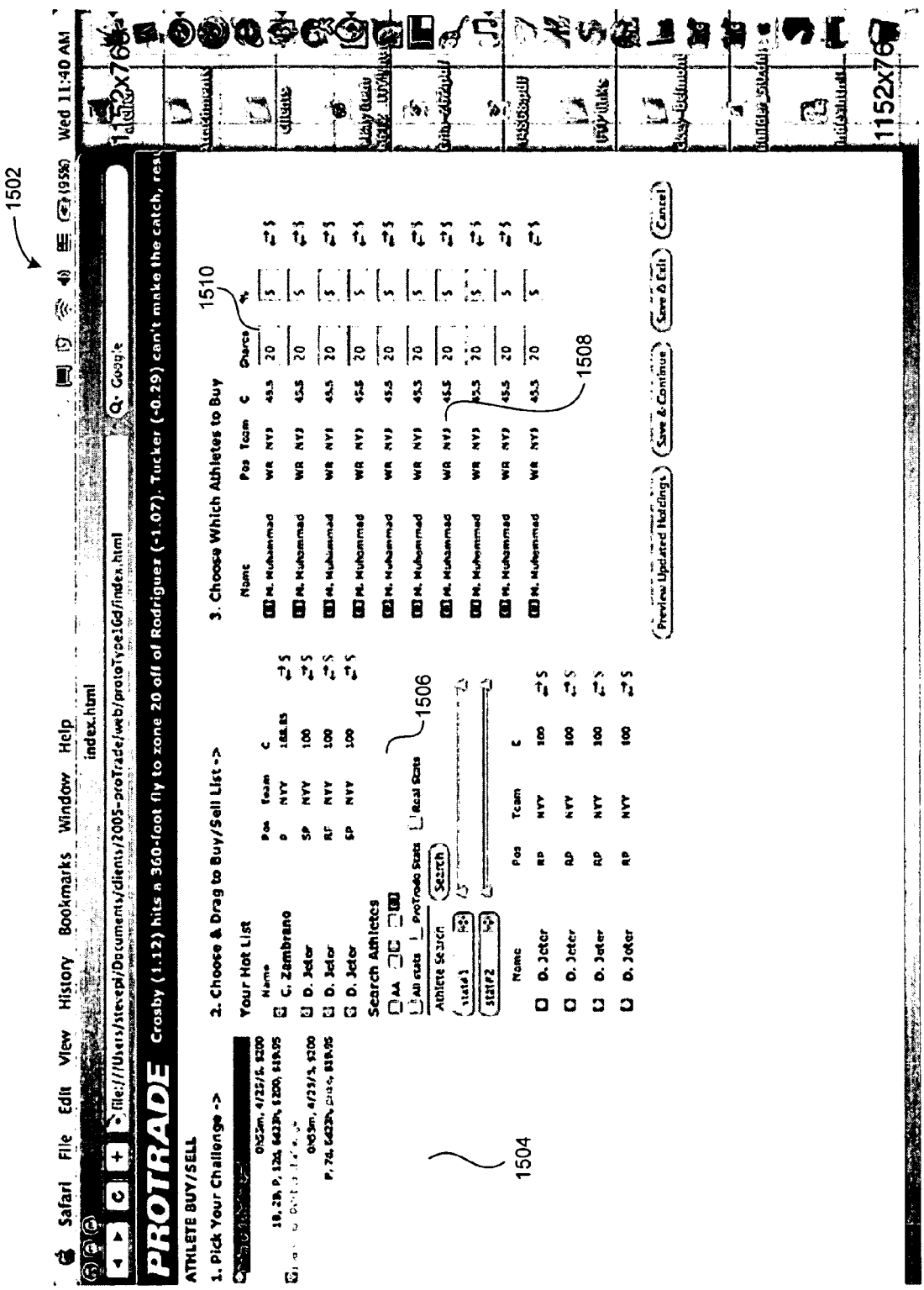
FIG. 15 is a display diagram showing a sample GUI through which a participant in a fantasy sports challenge can purchase shares of financial instruments.

FIG. 15 is a display diagram showing a sample GUI through which a participant in a fantasy sports challenge can purchase shares of financial instruments. As depicted, GUI 1502 shows a challenge selection area 1504, an athlete selection area 1506, and an athlete purchase area 1508. In some embodiments, the challenge selection area displays to a user a list of fantasy sports challenges the user is participating in, and allows the user to select a fantasy sports challenge from the list of fantasy sports challenges. The athlete selection area displays a list of athletes that may be purchased by the user and held as shares in the user's portfolio. In some embodiments, the athletes listed in the athlete selection area depend on the fantasy sports challenge selected by the user in the challenge selection area.

In some embodiments, the athlete selection area may display zero, one or more athletes in the user's "hot list" of athletes. For example, and as depicted in FIG. 15, the user may specify one or more searchable criteria using the sets of drop down menus and sliders to display a list of athletes that meet the specified athlete search criteria in the user's hot list, or other suitable area of the GUI. The user may then select one or more of the displayed list of athletes that meet the specified search criteria for purchase.

The user can then select one or more athletes from the athlete selection area by, for example, clicking on the desired athlete or control-clicking on the desired athletes, and "dragging" the selected athletes to the athlete purchase area. For each athlete dragged to the athlete purchase area, the user can specify the number of shares of the athlete to purchase in a shares box 1510. Once the desired athletes are selected and dragged to the athlete purchase area, and the number of shares to purchase for each athlete is specified, the user can submit a buy order to purchase the specified shares of the athletes by clicking on a submit market order button (not shown). In response, the market exchange server component of the valuation system executes the market order. Thus, the GUI allows participants in a fantasy sports challenge to easily select athletes for purchase by clicking and dragging the desired athletes from one column to another column in the display.

In some embodiments, the valuation system or a component of the valuation system, such as the fantasy game server, may provide a GUI similar to GUI 1502 to allow a user to purchase shares of financial instruments in athletes. For example, the GUI may allow a user to select one or more financial instruments in athletes from a financial instrument selection area and place the selected financial instruments in a financial instrument purchase area. Once the desired financial instruments are selected and placed in the financial instrument purchase area, the user can specify the number of shares of the financial instrument or instruments to purchase and submit a buy order to purchase the specified shares of the financial instruments.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A method comprising:
   identifying, by a computing system, a current play occurring during an athletic competition:
   determining, by the computing system, a current game state for the current play, the current game state determined from a plurality of factors that describe the athletic competition after occurrence of the current play;
   determining, by the computing system, a previous game state for a prior play, the prior play occurring just prior to the current play, the previous game state determined from a plurality of factors that describe the athletic competition after the occurrence of the prior play;
   determining, by the computing system, a current expectation of scoring for the current game state;
   determining, by the computing system, a previous expectation of scoring for the previous game state; and
   determining, by the computing system, a value of the current play as a difference between the current expectation of scoring based on historical statistics of a plurality of athletes and the previous expectation of scoring and an addition of scoring generated on the current play, wherein the value is determined in real-time.

2. The method of claim 1, wherein the expectation of scoring is based on an analysis of a number of game states that have occurred in past athletic competitions.

3. The method of claim 1, wherein the expectation of scoring is determined by forward simulation.

4. The method of claim 1, wherein the expectation of scoring is determined by random value assignment.

5. The method of claim 1, wherein the expectation of scoring is the scoring that should occur during a segment of the game.

6. The method of claim 1 further comprising:
   identifying at least one athlete involved in the current play; and
   distributing at least a portion of the value of the current play to the identified at least one athlete, wherein the value of the current play is distributed according to the athlete's participation in the currently play.

7. The method of claim 6, wherein the athlete's participation is based on an analysis of a number of game states that have occurred in past athletic competitions.

8. A computer-readable storage medium whose contents cause a computing system to determine in real-time an expected scoring during an athletic competition, the contents cause the computing system to:
   determine a current state in the athletic competition, the current state determined from at least one factor that describes the state of the athletic competition;
   determine a previous state in the athletic competition, the previous state determined from at least one factor that describes the state of the athletic competition;
   determine a current expectation of scoring based on the current state, the current expectation of scoring determined from an analysis of a number of states that have occurred during past athletic competitions;
   determine a previous expectation of scoring for the previous state, the previous expectation of scoring determined from the analysis of a number of states that have occurred during past athletic competitions; and
   determine a value of the current state based at least in part from the current expectation of scoring based on historical statistics of a plurality of athletes and the previous expectation of scoring.

9. The computer-readable storage medium of claim 8, wherein the at least one factor includes a current score in the athletic competition.

10. The computer-readable storage medium of claim 8, wherein the at least one factor includes an indication of a time in the athletic competition.

11. The computer-readable storage medium of claim 8, wherein the at least one factor includes an indication of type of surface the athletic competition is being contested on.

12. The computer-readable storage medium of claim 8, wherein the at least one factor includes an indication of weather condition during the athletic competition.

13. The computer-readable storage medium of claim 8, wherein the current expectation of scoring is an expected of scoring during a segment of the athletic competition.

14. The computer-readable storage medium of claim 8, wherein the athletic competition is a baseball game.

15. The computer-readable storage medium of claim 8, wherein the athletic competition is a football game.

16. The computer-readable storage medium of claim 8, wherein the athletic competition is a basketball game.

17. The computer-readable storage medium of claim 8, wherein the athletic competition is a golf tournament.

18. The computer-readable storage medium of claim 8, wherein the athletic competition is auto racing.

19. The computer-readable storage medium of claim 8, wherein the athletic competition is soccer.

20. The computer-readable storage medium of claim 8, wherein the athletic competition is volleyball.

21. The computer-readable storage medium of claim 8, wherein the athletic competition is cycling.

22. The computer-readable storage medium of claim 8, wherein the athletic competition is track and field.

23. A computer-readable storage medium whose contents cause a computing system to determine in real-time values of plays occurring during a sports competition, by:
  identifying a current play; determining a first expectation of scoring prior to the current play, the first expectation of scoring based a first state existing prior to the current play;
  determining a second expectation of scoring subsequent to the execution the current play, the second expectation of scoring based on a second state existing subsequent to the current play; and
  determining a value for the current play from the first expectation of scoring based on historical statistics of a plurality of athletes and the second expectation of scoring and an addition of scoring generated from the current play, wherein the first and second states are determined using at least one condition that describes the sports competition.

24. The computer-readable storage medium of claim 23, wherein the at least one condition indicates a current score differential in the sports competition.

25. The computer-readable storage medium of claim 23, wherein the at least one condition indicates a time remaining in the sports competition.

26. The computer-readable storage medium of claim 23, wherein the at least one condition indicates a current position of a competitor participating in the sports competition.

27. A computer-readable storage medium whose contents cause a computing system to determine in real-time a value of a play occurring during an athletic competition, by:
  identifying a play occurring during an athletic competition;
  identifying an intermediate state of the play;
  determining a first intermediate expectation of scoring based on an expectation of the intermediate state, the first intermediate expectation of scoring based on at least one factor that describes the condition of the athletic competition prior to the intermediate state;
  determining a second intermediate expectation of scoring based on an actual result of the intermediate state, the second intermediate expectation of scoring based on at least one factor that describes the condition of the athletic competition resulting from the intermediate state; and
  determining a value for the intermediate state based at least in part from the first intermediate expectation of scoring based on historical statistics of a plurality of athletes and the second intermediate expectation of scoring.

28. The computer-readable storage medium of claim 27 further comprising contents that cause the computer system to determine in real-time a value of a play occurring during an athletic competition, by:
  identifying a second intermediate state of the play;
  determining a third intermediate expectation of scoring based on an actual result of the second intermediate state, the third intermediate expectation of scoring based on at least one factor that describes the condition of the athletic competition resulting from the second intermediate state; and
  determining a value for the second intermediate state based at least in part from the second intermediate expectation of scoring and the third intermediate expectation of scoring, wherein the intermediate state and the second intermediate state represent a flow of the play.

29. The computer-readable storage medium of claim 27, wherein the intermediate state corresponds to an athlete performance event which is a measurable component of the play.

30. A method comprising:
  identifying, by a computing system, a current play occurring during a sports competition;
  determining, by the computing system, a first expectation of scoring prior to the current play, the first expectation of scoring based a first state existing prior to the current play, the first state determined using at least one condition that describes the sport competition;
  determining, by the computing system, a second expectation of scoring subsequent to execution of the current play, the second expectation of scoring based on a second state existing subsequent to the current play, the second state determined using at least one condition that describes the sports competition; and
  determining, by the computing system, a value for the current play from the first expectation of scoring based on historical statistics of a plurality of athletes and the second expectation of scoring and scoring generated from the current play.

31. The method of claim 30 further comprising providing the determined first expectation of scoring to a media outlet.

32. The method of claim 31, wherein the determined expectation of scoring is broadcast by the media outlet.

33. The method of claim 31, wherein the determined expectation of scoring is displayed by the media outlet within the context of a feed of the sports competition.

34. The method of claim 31 further comprising:
  providing the determined second expectation of scoring to the media outlet.

35. The method of claim 30 further comprising broadcasting the determined expectation of scoring.

* * * * *